(12) United States Patent
Garcia

(10) Patent No.: US 9,696,897 B2
(45) Date of Patent: Jul. 4, 2017

(54) IMAGE-BASED MEASUREMENT TOOLS

(71) Applicant: The Regents of the University of California, Oakland, CA (US)

(72) Inventor: Maurice Garcia, San Francisco, CA (US)

(73) Assignee: The Regents of the University of California, Oakland, CA (US)

(*) Notice: Subject to any disclaimer, the term of this patent is extended or adjusted under 35 U.S.C. 154(b) by 353 days.

(21) Appl. No.: 14/352,943

(22) PCT Filed: Oct. 19, 2012

(86) PCT No.: PCT/US2012/061032
§ 371 (c)(1),
(2) Date: Apr. 18, 2014

(87) PCT Pub. No.: WO2013/059599
PCT Pub. Date: Apr. 25, 2013

(65) Prior Publication Data
US 2014/0300722 A1    Oct. 9, 2014

Related U.S. Application Data

(60) Provisional application No. 61/548,780, filed on Oct. 19, 2011.

(51) Int. Cl.
*H04N 7/18* (2006.01)
*G06F 3/0487* (2013.01)
*G01B 11/02* (2006.01)
*G06F 3/0482* (2013.01)
*G06T 7/62* (2017.01)

(52) U.S. Cl.
CPC ............ *G06F 3/0487* (2013.01); *G01B 11/02* (2013.01); *G01B 11/022* (2013.01); *G06F 3/0482* (2013.01); *G06T 7/62* (2017.01); *G06T 2207/10004* (2013.01)

(58) Field of Classification Search
CPC ........................................................ G06F 3/0487
USPC ............................................................. 348/77
See application file for complete search history.

(56) References Cited

U.S. PATENT DOCUMENTS

| | | | |
|---|---|---|---|
| 2004/0016870 A1 | 1/2004 | Pawlicki et al. | |
| 2010/0020221 A1* | 1/2010 | Tupman .............. | G06F 3/04883 348/333.01 |
| 2011/0164128 A1* | 7/2011 | Burgett ................ | A61B 5/1076 348/77 |

FOREIGN PATENT DOCUMENTS

| | | |
|---|---|---|
| JP | 2008-211409 A | 9/2008 |
| KR | 10-2010-0033634 A | 3/2010 |
| KR | 10-1032466 B1 | 5/2011 |

OTHER PUBLICATIONS

RulerPhone, retrieved from the internet, www.trytap.com, printed on Apr. 9, 2014.

(Continued)

*Primary Examiner* — Richard Torrente

(57) ABSTRACT

Provided are methods, systems, devices, and computer programs enabling the measurement of various objects using imaging. The inventions are adaptable to mobile devices such as smartphones, allowing a range of unique measurements to be conveniently made, including length, area, distance, velocity, and height. The methods, systems, devices, and computer programs include the novel application of image-based measurement in medical, research, and other contexts.

15 Claims, 9 Drawing Sheets

(56) References Cited

OTHER PUBLICATIONS

Baker, et al., "Shape-from-silhouette of articulated objects and its use for human body kinematics estimation and motion capture," Computer Vision and Pattern Recognition, Proceedings 2003 IEEE Computer Society Conference, Jun. 2003, vol. 1, pp. 77-84. Whole document.

* cited by examiner

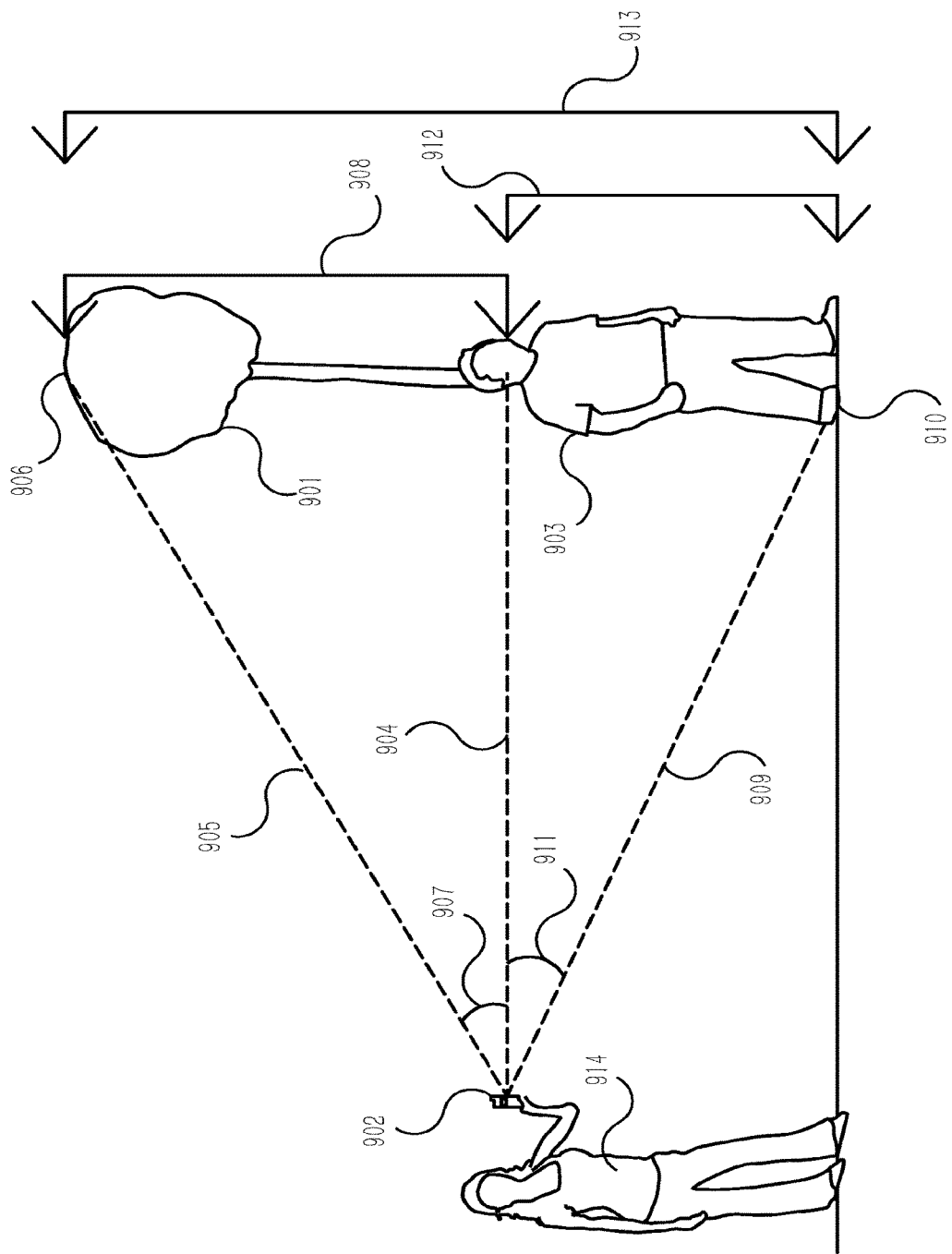

IMAGE-BASED MEASUREMENT TOOLS

CROSS-REFERENCE TO RELATED APPLICATIONS

This application is based on and claims the benefit of priority of U.S. Provisional Patent Application Ser. No. 61/548,750, filed on Oct. 19, 2011, the contents of which are incorporated by reference.

STATEMENT REGARDING FEDERALLY SPONSORED RESEARCH OR DEVELOPMENT

This invention was made with United States government support under Grant Number NIH NICHD K08 HD069462-01 awarded by the National Institutes of Health. The United States government has certain rights in the invention.

REFERENCE TO SEQUENCE LISTING, A TABLE, OR A COMPUTER PROGRAM LISTING COMPACT DISK APPENDIX

Not Applicable

FIELD OF THE INVENTION

The invention relates to the field of measurement, specifically, the use of novel image-based measurement tools to accurately determine the dimensions of objects that have been imaged, i.e., photographed, in a variety of contexts. The invention further includes methods for the determination of using image analysis to determine the distance of objects from a camera, as well the velocity of a moving object. Certain embodiments of the invention are directed to the use of the disclosed methods on mobile devices, for example, smartphones.

BACKGROUND OF THE INVENTION

In medicine, science, engineering, and just about every other aspect of human endeavor, there is the need to measure the size of items. The object of the invention disclosed herein is to provide new methods and devices for the facile and accurate measurement of length, width, height, area, volume, curvature, and other dimensional features of various items, ranging from microscopic to enormous. The inventions disclosed herein are further directed to the measurement of distance, velocity, and very tall heights. The methods, systems, software, and devices provided herein provide the art with novel solutions for a variety of measurement problems.

In many situations, direct measurement of an object is not easily achieved. For example, the scale of an item can make its measurement difficult, as in the case of microscopic cells or tall trees. In other cases, accurate measurement is difficult to achieve, as in the case of irregularly shaped objects, such as skin lesions or plant leaves. In some situations, such as remote medicine, the item to be assessed and the persons capable of making the assessments are separated by great distance. In yet other cases, there is the need for a large number of measurements to be taken and it would be advantageous to have a means of quickly collecting massive amounts of measurement data, for examples, as in agriculture. Thus, there is a need in the art for solutions that solve these many problems. There is a need in the art for systems that allow for accurate measurement of items, for the convenient measurement of items, for the measurement of items that are remote, and for the fast measurement of multiple items.

The methods disclosed herein are readily implemented, in whole or in part, on mobile devices, for example, smartphones. The use of image-based measurement systems implemented on mobile devices to determine the dimensions of an object is known in the art. For example, the Ruler-Phone application, by Ben Kamens (2008), provides a mobile-phone based tool for the measurement of one-dimensional lengths using images acquired by the user. The invention disclosed herein provides novel features and methods not included in the prior art measurement tools which improve upon the accuracy, convenience, versatility, and usability of the prior art methods.

The invention disclosed herein provides methods, devices, and systems that address various measurement needs and which provide advantageous solutions in a wide variety of specific contexts, such as medicine, health and fitness, scientific research, engineering, and even novelty use.

SUMMARY OF THE INVENTION

The basic function of the invention is to conveniently and accurately measure the size attributes of various items using imaging. The length, area, and angular features of an item will often have particular relevance in certain contexts. In various fields of biological research, determining the size (e.g. area, volume) of cells, organs, or whole organisms is of great importance in assessing the health, growth rate, and other features of living things. In medicine, the size or other geometrical attributes of a feature are of importance in diagnosing various conditions. In other medical contexts, serial measurements of a wound, a lesion, or other feature can be used to assess progression, prognosis and treatment efficacy of a condition.

The methods of the invention can be utilized to determine the size of an object in one dimension, i.e. a linear measurement. Typical linear measurements are length, width, and height. For many items, the concepts of length, width, and height are commonly understood to refer to the one-dimensional measure of a certain axis with specific endpoints. These commonly accepted measures rely on easily delineated endpoints and they allow for size comparisons between individual items. Even complex three-dimensional items can be meaningfully compared using measures of a single axis common to all objects of the same type, using accepted and easily identified endpoints. For example, the height of a person is commonly understood to refer to the one-dimensional distance from the bottom of the person's feet to the top of their head.

The methods of the invention may also be used to measure the area of an item which is substantially flat or which has a planar aspect. In the case of objects having known proportional relationships, the methods of the invention can also be utilized to derive one or more indicative measurements which can then be used to estimate other parameters with known mathematical relationships to the measured aspect(s). For example, in the case of objects which are substantially cylindrical or spherical, the methods of the invention can be used to measure the diameter of the object and then calculate the circumference and volume of the object. The methods of the invention may also be used to measure angular aspects of an item, such as curvature, angle of taper, and other geometrical features of the item that have particular relevance. In some embodiments, multiple measurements of the item from different angles can be analyzed in order to determine the desired parameter.

The description contained herein, for convenience, describes various embodiments directed to measuring the size of objects. However, it is understood that the methods, systems, software, and devices systems of the invention may also be applied to the measurement of any spatial area of interest, for example, the distance between objects. For example, the linear measurement techniques described herein could be utilized to measure the distance between a person's wrist and the floor, which is a medically useful parameter for fitting patients with walkers or other mobility assist devices.

The basic function of the invention will be referred to as "image-based measurement." Image based measurement is carried out in five basic steps. First, a reference standard, i.e., an object of known dimensions, is placed on, near, or otherwise in plane with the item to be measured. Secondly, an image capture means, such as a digital camera, is used to capture an image of the item and the reference standard in the same image. Third, a processing means, guided by user delineations, analyzes the image and compares the image size of the reference standard to its actual size, deriving the relationship between image size and the actual size of the objects depicted in the image. Fourth, the image size of the item of interest is measured. Lastly, using the previously calculated relationship between image size and actual size, and the image size of the item of interest, the actual size of the item of interest is determined. Reduced to its most basic sense, image-based measurement is akin to placing a ruler next to an item and photographing them together; then using the size of the ruler in the image to determine the actual size of the item.

Image-based measurement is known in the art. For example, the RulerPhone (by Ben Kamens, 2008) mobile phone application utilizes the basic image-based measurement system described above, in which a credit card is used as the reference standard. The RulerPhone application does not allow the use of objects other than credit cards to be utilized as a reference standard.

The novel inventions disclosed herein include improvements to the prior art, which such improvement increase the accuracy, convenience, and versatility of the prior art methods. These further includes unique methods, devices, systems and computer programs to carry out image-based measurement, and the use of these methods, devices, systems and computer programs in novel and useful contexts.

Disclosed herein is a method for the accurate measurement of distance. This method employs the basic linear measurement techniques disclosed herein, taking advantage of certain optical properties of cameras, to yield facile and accurate measurements of distance. The distance measurement method is employed in further embodiments for the measurement of velocity and determining the height of very tall objects.

The methods of the invention are carried out using a combination of hardware elements and non-transitory computer-readable storage medium having computer-readable program instructions stored therein. The computer-readable program instructions may include a plurality of program instructions which carry out the methods of the invention on one or more devices. It will be understood by one of skill in the art that the steps of the various processes described herein may be carried out using a wide variety of programming solutions and computer controlled hardware to effect the processes described in these exemplary embodiments.

The methods, systems, and devices of the invention can be configured in various ways. In some embodiments, all the elements of the invention are housed in a single device, allowing the desired measurements to be calculated and analyzed on-site. In other embodiments, the image capture steps and the image analysis steps are performed on separate devices. In some embodiments, multiple devices are utilized at various sites. Additionally, off-site databases may be accessed by the devices to provide inputs for the analysis process, or other data.

The methods, systems, devices, and computer program products of the invention may be carried out on a wide variety of devices, including mobile telephones, tablet PC's, laptop computers, desktop computers, and cloud computers. Hardware for image acquisition may include, for example, stand-alone digital cameras, digital camera modules embedded in mobile phones, tablets, or laptop computers, and plug-in webcams. User input devices may include, for example, touchscreens, mouse interfaces, pen tool interfaces, keyboard interfaces, and voice activated controllers. It is recognized by one of skill in the art that there are multiple programming options for practicing the invention, including a variety of operating systems and programming languages. One of skill in the art, guided by this disclosure, can readily choose the proper hardware drivers and control modules and implement the image acquisition and image analysis functions described herein.

In many embodiments of the invention, all or some portion of the processes claimed herein are carried out on a smartphone. In recent years, there has been an incredible proliferation of smartphones. In 2010, it was estimated that over 45 million smartphones were in use in the United States alone. Exemplary smartphones include the Apple iPhone™ and the Motorola Droid™. Smartphones are wireless, compact, hand-held devices that, in addition to basic cellular telephone functions, include a range of compact hardware. Typical smartphones have embedded digital cameras, large touchscreen displays, and broadband or Wi-Fi capabilities allowing for the receipt and transmission of large amounts of data to and from the Internet.

Smartphones not only include a range of hardware, they are also configured to download and run a wide variety of software applications, commonly called "apps." Although the proliferation of smartphones is a recent phenomenon, there already exists a mature and well developed system for the delivery of apps to smartphone users.

The proliferation of smartphones, with their combination of portable hardware and readily loaded software applications, creates a platform upon which many embodiments of the invention may be practiced. While the methods, devices, and systems of the invention are not limited to the use of smartphones, the invention most advantageously utilizes basic features of smartphones and extends the capabilities of these devices to include accurate and convenient measurement of many items. In essence, the inventions described herein may conveniently convert a common smartphone into a medical device, research tool, or measurement system, and a means of compiling, communicating and comparing measurements, all without requiring the user to obtain any additional specialized equipment.

DESCRIPTION OF THE DRAWINGS

FIG. 2 depicts the apparent change in size of a dynamic reference standard that pivots as it is pressed against objects of varying thickness. FIG. 2 depicts a dynamic reference standard comprising a bar (202) of known length attached to a rod (204) extending from the camera, the bar attached to the rod by a pivoting means (203).

FIG. 9. Exemplary illustration of the height measurement method of the invention using a camera- and inclinometer-equipped mobile device.

DETAILED DESCRIPTION OF THE INVENTION

Figure 1A:
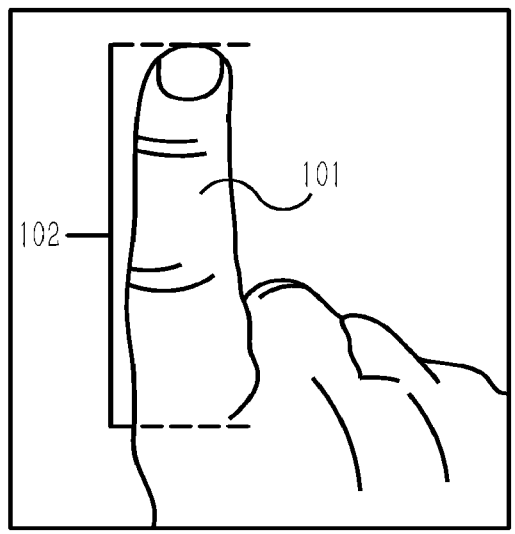
FIG. 1. This drawing depicts the effect of foreshortening. When the finger (101) is oriented perfectly vertically (FIG. 1A), its length (102) measures 62 mm in the image. When the same finger is oriented away from the camera, at an angle that is not perpendicular with the plane of the image (FIG. 1B), the length of the finger (103) is 51 mm in the image.

The invention comprises various methods of carrying out image-based measurement. In some aspects, the invention comprises novel systems for measuring parameters of interest. In other aspects, the invention comprises novel improvements to known methods of image-based measurement. In other aspects, the invention comprises novel implementations of image-based measurement on mobile devices. In yet other aspects, the invention comprises the application of image-based measurement to novel contexts. In still other aspects, the invention comprises novel image-based technical solutions to measurement problems. In still other aspects, the invention comprises software programs, i.e. computer instructions stored on a nontransitory computer readable storage medium that when executed by a machine result in the desired operations occurring. The methods of the invention are enabled and executed by the use of various software programs, comprising nontransitory computer readable storage medium carrying computer programs that will cause a suitable general purpose computer to carry out the methods described herein. It will be appreciated by one of skill in the art that these computer operations enabled by the software encompass interactions with a variety of standard processing means, data storage and retrieval means, hardware elements, user interfaces, and user inputs to effect the methods described herein.

Image-Based Measurement.

Image-based measurement may be used to determine a dimension of interest, for example length along a particular axis, diameter, or area, such as the height of a person, the diameter of a coin, or the area of a rash. Image-based measurement encompasses the imaging of a "target object," which is an object of unknown dimensions, and a "reference standard object." (or "reference standard") which is an object, at least one dimension of which (for example length, diameter, etc.) is known. Subsequently, the image sizes of the target object and reference standard object are measured. As used herein, "image size" refers to a dimension of interest of an object pictured in an image, i.e. the actual physical size of the object in the image. For example, in a photograph of an upright person, the person's height in the image would be a measure of image size. Generally, as used herein, image size will refer to the physical size of an object represented in an image which is stored as a computer image file, i.e. a digital photograph. Physical size of features within the image may be measured in pixels. The actual physical size of pixels within a digital image will vary between images, depending on the pixel resolution and pixel density (e.g. pixels per inch) of the image, however, within an image these properties are fixed and physical features of objects within the image may be compared by determining linear or areal pixel dimensions. In some contexts, image size will refer to the dimension of interest of a feature pictured within a displayed or printed image. The actual physical size of such features will vary depending on the resolution of the original image and the resolution of the display or print, but in any case, these parameters are typically fixed within a displayed or printed image and meaningful comparisons of sizes within such displayed or printed image may be made.

As used herein, the proportion between an object's actual size to its image size will be called minification, as described in Equation 1.

$$\text{Minification} = \frac{\text{Actual Size of Object}}{\text{Object's Size in Image}} \quad \text{Equation 1}$$

Figure 7:
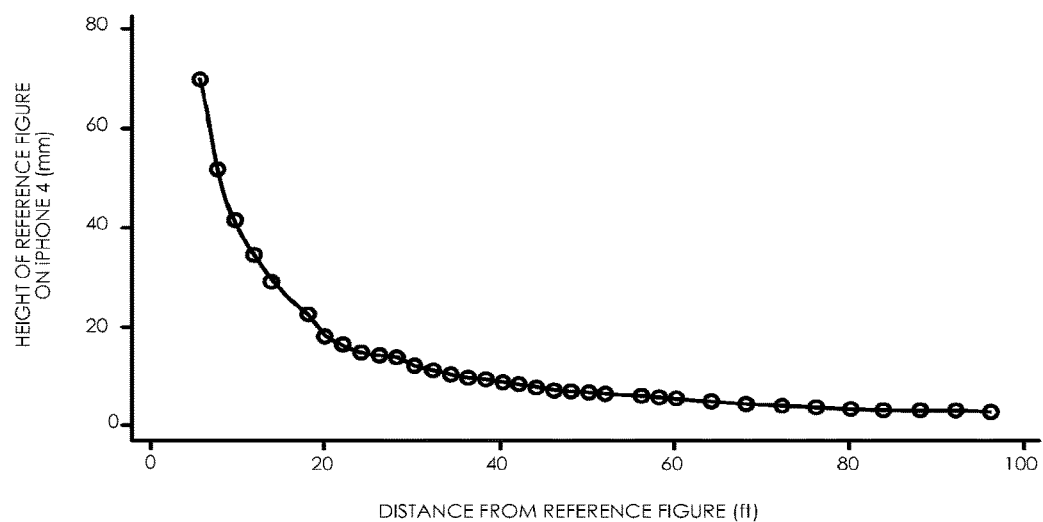
FIG. 7 depicts the relationship between minification and distance. In this example, a person standing 68 inches in height was photographed at distances ranging from 10 to 95 feet from the camera. The camera used was the standard camera module of an Apple iPhone 4. Image size of the person in the resulting images was measured by displaying each image on the iPhone 4 screen and measuring the person's height in the displayed image using a ruler. The person's image height in each picture was plotted against the person's distance from the camera at the time each image was acquired.

Although this proportion is referred to as minification herein for convenience, it is understood that objects are not necessarily de-magnified in an image. Microscopic objects and even small objects (e.g. of a few inches in length) may have an image size many times their actual size when pictured in images several inches wide by several inches long, such as are attained by standard digital camera modules included in smartphones. The degree of minification increases as an object is moved further from the camera, for example, as depicted in FIG. 7. Therefore, at any given distance, the degree of minification of all objects imaged at that distance will be substantially equal. The degree of minification of a reference standard object in an image can be determined by dividing the reference object's size by its image size. Assuming proper alignment, as discussed later herein, if the target object has been photographed at substantially the same distance from the camera as the reference object, its degree of minification will be the same as that of the reference standard object, for example as expressed in Equation 2.

$$\frac{\text{Reference Standard Object's Actual Size}}{\text{Reference Standard Object's Image Size}} = \frac{\text{Target Object's Actual Size}}{\text{Target Object's Image Size}}. \quad \text{Equation 2}$$

Accordingly, the actual size of the target object may be determined using that object's image size and the degree of minification, for example as described in Equation 3.

$$\text{Target Actual Size} = \text{Target Object Image} \quad \text{Equation 3}$$
$$\text{Size} \times \frac{\text{Actual Size of Reference Standard Object}}{\text{Image Size of Reference Standard Object}}.$$

Reference Standards.

The invention encompasses the use of various reference standard objects. A reference standard object, or reference standard, is an object of known proportions that is photographed on, next-to, or otherwise in-plane with the item to be measured. The type of reference standard object to be used and the size of the reference standard will be determined by the scale of the target object. For example, when measuring microscopic cells, objects such as microshperes or microbeads can be utilized as reference standards. In the case of measurement of body parts, objects of one inch to one foot in size might be used. In the case of large target objects such as buildings or trees, objects of many feet in size might be employed as reference standards. Depending on the resolution of the images being captured, reference standards of 1% to 10,000% of the size of the item being measured may be used. Preferred reference standards are in the range of 20% to 500% of the size of the target object. Especially preferred reference standards are in the range of 50% to 200% of the size of the target object. In general, the use of a reference standard having a size that is close to that of the target object (e.g. 50% to 200% of the size of target object) is advantageous. If a reference standard and target object are of widely varying scales, the resolution of the smaller item in the image may be compromised due to the limitations of the image acquisition means (e.g. low resolution) or defects in the image (e.g., low light, blur from camera motion, etc). This may result in either an erroneous delineation of the reference standard or the target object, compromising the accuracy of the resulting measurement calculation. Additionally, in the event that the image is not taken in-plane, the measurement errors introduced by foreshortening, as discussed herein, will be amplified if the reference standard and item being measured are not of similar sizes.

In the prior art image-based measurement method employed by RulerPhone, only a single object, a credit card, may be utilized as a reference standard. During the reference standard delineation step of the process, RulerPhone superimposes a box said to conform to the proportions of a standard credit card over the acquired image. RulerPhone's limitation to a single reference standard and calibration icon presents many disadvantages for the user. First, the proportions of various bank cards, credit cards, ID's, and like items may vary considerably and all such cards do not fit the fixed-size calibration icon box utilized in RulerPhone. Secondly, the user may not have a credit card available to use in the image acquisition step. Third, as discussed above, accuracy may be compromised when the reference standard and the target object are of widely varying scale, and a credit card will not be the optimal reference standard for measurements of items that are substantially smaller (e.g. less than one inch) or larger (e.g. greater than a foot) than a credit card.

The invention advantageously overcomes the limitations of the prior art by allowing the user to utilize any object, or any dimension defined within an image, as a reference standard. Preferred reference standards include common objects having consistent and known dimensions to be utilized. For example, a coin is a common item that is easily obtained and which has a fairly consistent diameter and area. Likewise, paper currency, beverage containers, cigarettes, pens, or any other mass-produced, widely available item can serve as a reference standard. The advantage of using common objects such as these is that their ubiquity allows the user to readily obtain them for making measurements. Table 1 lists some common items of consistent dimensions that may be used as reference standard items.

TABLE 1

| Object | Dimensions | Shape of Delineation Icon |
|---|---|---|
| United States Quarter Dollar Coin | Diameter: 24.26 mm | Circular |
| United States Paper Currency | Height: 2.61, Width: 6.14 (inches) | Rectangle with height to width ratio = 0.4251 |
| 2 Euro Coin | Diameter 25.75 mm | Circular |
| 1 Euro Coin | Diameter: 23.25 mm | Circular |
| 5 Euro | Height: 62 mm, | Rectangle with height to |

TABLE 1-continued

| Object | Dimensions | Shape of Delineation Icon |
|---|---|---|
| Bank Note | Width 120 mm | width ratio = 0.5167 |
| 20 Euro Bank Note | Height: 72 mm, Width 133 mm | Rectangle with height to width ratio = 0.5413 |
| 1 Renminbi Coin | Diameter: 25 mm | Circular |
| 10 Renminbi Bank Note | Height: 70 mm, Width 140 mm | Rectangle with height to width ratio = 0.5000 |
| 2000 Yen Bank Note | Height: 76 mm, Width 154 mm | Rectangle with height to width ratio = 0.4935 |
| Standard 2-liter beverage container (United States) | Height: 12.25 inches Diameter: 4 inches | Irregular |
| Bank Card (ISO/IEC 7810 ID-1) | Height: 53.98 mm Width: 85.60 mm | Rectangle with height to width ratio = 0.6306 (rounded corners) |
| 12 Ounce Aluminum Beverage Container | Height 4.83 inches Diameter: 2.6 inches | Rectangular |

The properties of the reference standard may vary widely, depending on the properties of the item being measured. For example, a coin offers rigidity and will not deform when pressed against the target item. Conversely, paper currency can be wrapped around items to conform to their shape, and the distortion of the graphics on the currency can then be used to calculate angular features or curvature of the wrapped item. The key feature of any reference standard is that its actual size must be known at the time of image analysis.

When measuring the image size of a reference standard object in an image, computer software programs implementing the image analysis steps of the invention may advantageously access a database containing dimensional information for a wide variety of common items. These may be displayed for the user, for example, in a drop-down menu, allowing the user to conveniently choose and utilize an available object contained in the database. For example, a software application marketed in the United States might employ a drop-down menu which lists United States coins, currency, stamps, mass-marketed aluminum beverage containers, mass-marketed cigarettes, mass-marketed gum, mass-marketed pens, credit cards, standard sized paper, and other common objects in the scale of one to a few inches, that are likely to be present in the average household in the United States. Depending on what geographic part of the world the software is being sold or used, the software may access a database describing the size attributes of common everyday objects e.g. (coins, paper currency, cigarettes, and other objects) easily accessible by a anyone in that particular part of the world. The software program may, for example, present these options to the user as choices in a drop-down menu.

Any item of known dimension can be utilized as the "ruler" reference standard. The reference standard might even be of unknown dimensions at the time of image capture, and can later be measured and used as a ruler to determine the measurement of interest. Custom (or otherwise unique) reference standards suited to a particular scale and context may also be used. Custom reference standards may also include additional information. For example, the user could employ tags or stickers as reference standards, such tags or stickers having known dimensions and which may further be printable or printed with information (such as the sample's identity) in writing, in bar code form, or in the form of QR or other data matrix tags.

Reference standards are not limited to tangible items. In some cases, the reference standard can take the form of points or shapes which are projected onto the item being measured. For example, two laser pointers a fixed distance apart may be used to project a line segment of known dimensions onto the item being measured.

Image Acquisition.

The various embodiments of the invention employ an image capture means, i.e., a camera. The purpose of the image capture means is to acquire and store an image of the item to be measured. Any device which photographs an item may serve as the image acquisition means, i.e., a device which captures reflected light from an item and which then converts this reflected light into a two-dimensional image. For convenience, the description herein will be largely directed to the use of digital cameras, however it is understood that any other image acquisition means capable of accurately converting visual data to a two-dimensional image may be used, such as film cameras. Images can be captured using a hand-held stand-alone digital camera, which such cameras generally create images having very high resolution. In certain medical applications, the image acquisition means will be specialized equipment such as an endoscopic camera, or a digital camera or digital video camera adapted for attachment to a microscope. While the methods of the invention rely on analysis of still images, video cameras may also be used in image acquisition, since the user may select desired still frames from the video file for analysis. Furthermore, the exact time at which each and every still frame is captured by a digital video camera is automatically recorded, and can be known when the video footage is viewed on a standard digital video editing platform (e.g. Apple Computer's "iMovie"). As such, the time elapsed between still frames can be easily calculated. Images may be also be captured from a live video feed using software known in the art, for example by the use of software programs such as Capture IT!™ (Pixel Post Studios) or Video Capture SDK™ (VisioForge).

Various embodiments of the invention are intended to be implemented on smartphones. Digital cameras (still-frame and/or video) are now standard equipment on most mobile phones. The compact digital camera modules utilized in modern smartphones generally have much lower performance quality than stand-alone digital cameras. However, with sufficient light, or with the addition of a flash unit, they can produce detailed images of adequate quality for most embodiments of the invention. Most smartphone cameras create images of 1 to 10 megapixels. The majority of smartphone digital cameras utilize CMOS active pixel sensor technology. The smartphone embodiments of the invention are not limited to any specific lens system, image resolution, or image capture technology.

Figure 1B:
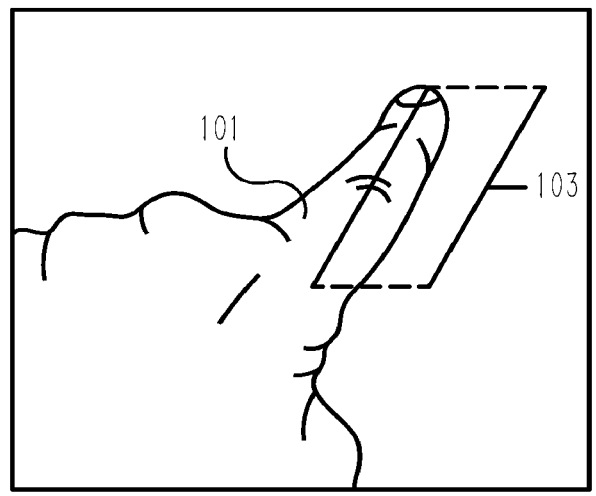

When capturing the images of the item to be measured, it is in most instances desirable that the plane of the camera lens, and thus the plane of the resulting image, be substantially parallel to the axis of the desired linear measurement. In other words, the principal axis, also called the optical axis, of the lens should be perpendicular to the axis of the desired linear measurement. For example, if the desired measurement is the height of a person, then, assuming the person is standing up straight, the camera lens should be oriented substantially parallel to the vertical axis of gravity (and the optical axis of the camera should be perpendicular to the vertical axis of gravity, i.e. parallel to the ground). To the degree that the orientation of the camera lens deviates from exactly parallel to the axis of the desired measurement, size-distortion of the image will occur and will impede accurate measurement. In an image taken of the item, the dimensions of the item will appear to be smaller than the actual dimensions of the item if the item is angled towards or away from the camera lens, a phenomena known as foreshortening. Foreshortening is demonstrated in FIG. 1, which depicts two images taken with a perfectly vertical camera lens (i.e., the field of view of the camera is perpendicular to the axis of gravity) of a finger. In one image, the finger is angled away from the camera lens (i.e., out of the vertical plane of the camera lens) and the apparent length of the finger (i.e. its size in the image) is shorter than the length of a finger held perfectly in plane with the camera lens.

In some instances, a perpendicular alignment of the camera to the axis of measurement (i.e. the plane of the image being parallel to the axis of measurement) is not necessary for accurate measurement. If the reference standard is placed alongside the axis of measurement of the item to be measured and the two items are of substantially equal length, the item can be accurately measured whether or not it (and the reference standard) are perpendicular to the optical axis of camera. If the two items are not perpendicular to the optical axis of the camera, they will appear foreshortened in the resulting image. However, because they are parallel to each other and are located at the same distance from the camera, they will be foreshortened by the same degree and the reference standard will provide an accurate "ruler" for measurement of the item. However, to the degree that the target item and reference standard object are of differing lengths, or are not the same distance from the camera, then depth of field effects will result in differential foreshortening of the objects in the resulting image. Accordingly, for accurate measurement, it is generally preferred that both the reference object and the item being measured are properly oriented with their axes of measurement substantially perpendicular to the optical axis of the camera (i.e. parallel to the plane of the image acquired by the image acquisition means). For vertically oriented objects, e.g. a person standing or walking, a substantially vertical camera alignment will be desired. For horizontally oriented objects, for example objects lying on a flat surface being imaged from above, a substantially horizontal camera orientation will be desirable.

Various guides can be utilized to aid the user in capturing images which are parallel to the axis of measurement, such that the captured image is in-plane with the item of interest. Such guides are not present in the prior art RulerPhone tool. Simple guides may consist of crosshairs, lines, protractors, or other markings which are overlaid upon the camera's preview field-of-view and which provide a sight for the user to line up on the target object. For example, a simple vertical line or horizontal line can help the user align the camera on vertical or horizontal target objects being photographed, respectively. In another example, a plurality of lines, such as a protractor, may be super-imposed on the visual field. In some embodiments of the invention, visual guides having the same shape as selected reference standards or target objects may be used. The user can then position the camera lens such that the guide in the camera viewfinder is perfectly superimposed over the reference standard or target object, aiding in the acquisition of a picture which is in-plane with the objects being photographed.

Devices having an internal inclinometer may be used to aid the user in aligning the camera in the desired orientation. For example, many smartphones contain compact inclinometers which allow the user to determine the orientation of the phone. Any inclinometer technology may be utilized, including accelerometer, liquid capacitive, or other level-sensing means known in the art. Physical devices such as a gas bubble in liquid may also be used. A smartphone with internal inclinometer, via a software interface, can provide the user with information regarding the orientation of the device when capturing images. Without the use of a tripod or other bracing apparatus, in some situations it may be difficult for a user to hold a hand-held device in a perfect orientation. However, unless perfect accuracy is required, a user may be able to hold the device within a few degrees of vertical or horizontal such that the image is captured within a tolerable degree of tilt. Depending on the item being measured and the desired degree of measurement accuracy, a factor of 1-10 degrees acceptable error may be used to establish an acceptable range for purposes of image capture.

Figure 3C:
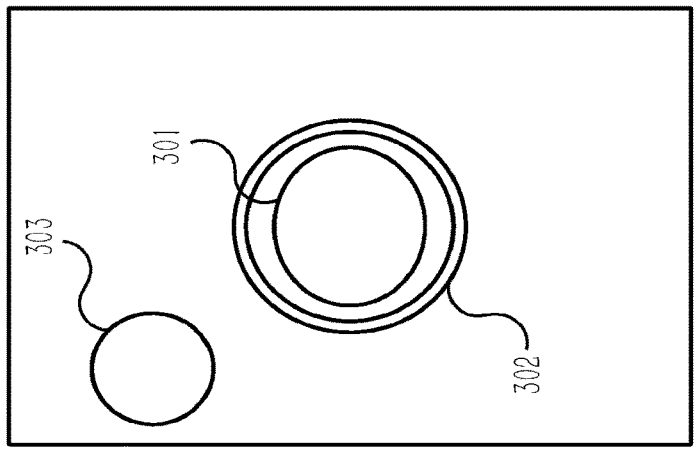
FIG. 3. This figure depicts an exemplary implementation of a visual interface displaying inclinometer data on the screen of a device during the camera aiming step in image acquisition. A virtual "bubble" (301) moves in response to the forward, backward, and lateral tilt of the device. When the camera is not level, the bubble appears outside the encircling guide (302), as in FIG. 3A, the direction of the deviance from the center corresponding to the orientation of the camera, and the degree of deviance from the center being proportional to the angle of tilt. When the camera is near level, the bubble (301) is still outside the encircling guide but is closer to being centered (302), as in FIG. 3B. When the camera is perfectly level, the bubble (301) appears centered within the guide (302), as in FIG. 3C. A color indicator, depicted as an indicator light or shading over some portion of the screen (303) also aids in orienting the camera, this feature changing color as the camera is leveled. For example, the color indicator may appear red when the camera is not level, yellow when the camera is near level, and green when the camera is substantially level, within an acceptable range of tilt.
Figure 3B:
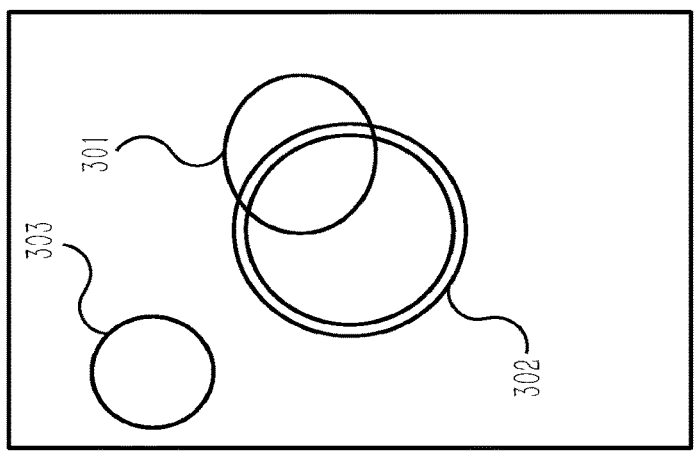
Figure 3A:
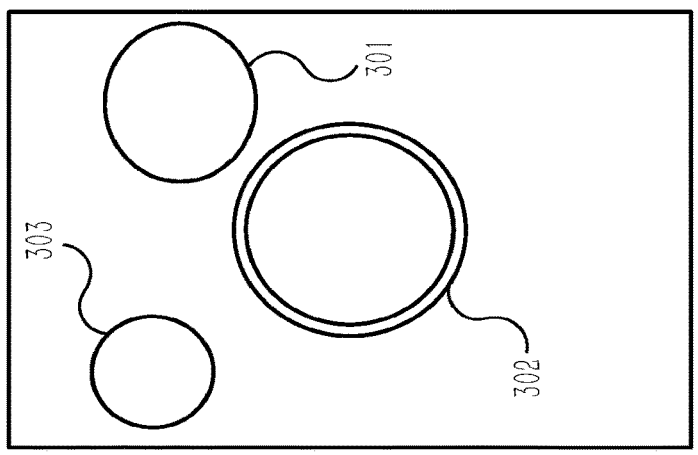

Various guides may be used to inform the user that the camera is within this acceptable range or outside the acceptable range, in the form of inclinometer data displays which are overlaid upon the camera preview field-of-view. First, the user inputs or selects the desired orientation of the image, for example vertical (parallel to the axis of gravity, in which case it is desired that the optical axis of the camera be aligned perpendicular to the axis of gravity), or horizontal (perpendicular to the axis of gravity, in which case it is desired that the optical axis of the camera be parallel to the axis of gravity). Upon such election, inclinometer is engaged and displays data informing the user of the magnitude and direction of deviance from the desired orientation. The data displayed may be in the form of numbers, informing the user of the degree of tilt, or it may be in the form of a virtual bubble level. The bubble level comprises a displayed "bubble," i.e. a moving shape (analogous to a bubble in an actual bubble level) which moves around the screen in response to changes in the orientation of the device, wherein the bubble will be located between stationary guides when the device is level. For example, when aiming at a vertically oriented target, the desired orientation of the camera's optical axis will be perpendicular to the axis of gravity, and a simple bubble level with two guides indicating the camera's forward or backward tilt may be displayed. Alternatively, for vertical orientation, a four sided bubble level may be displayed, indicating to the user the amount of forward or backward tilt and the degree of clockwise or counterclockwise tilt. When aiming at a horizontally oriented object, the desired orientation of the camera's optical axis will be parallel to the axis of gravity, and a virtual surface level (sometimes called a bull's eye level) may be displayed. The surface level comprises a displayed square or circular guide which remains stationary when the camera is moved, and a moving "bubble" icon, wherein the degree and direction of the camera's tilt is indicated by the bubble's deviation from the center of the guide. When the bubble is centered, the camera's optical axis is within an acceptable degree of tilt. The use of such virtual bubble levels is advantageous because it gives the user a quick and easy way to determine that the device is out of the acceptable plane of measurement and in which direction the device should be tilted to attain in-plane measurements. An exemplary surface level is depicted in FIG. 3. Exemplary virtual bubble level software applications include iHandy Level (iHandy Software) or Bubble Level (MUGOCO Inc.).

Additionally, the level-sensing data display may further comprise of color coded visual signals, for example, green, yellow and red lights or shading, which inform the user that the device is within the acceptable range, close to the acceptable range, or outside the acceptable range. Alternatively, the degree and direction of tilt required to attain proper orientation could be communicated to the user via audio signals. For example, if a nearly vertical camera is required for an acceptable image and the camera is held at an unacceptable incline, an audio prompt to tilt the camera slightly forward could be sounded. FIG. 3 depicts exemplary visual guides which can inform the user of the camera's orientation.

Another feature that can aid the user in capturing accurate images is a function that locks out the camera's image acquisition function if the camera is not in the acceptable range of orientation. Additionally, the camera could be controlled by a controller function which directs the camera to automatically capture an image when the camera is held within the acceptable range of orientation, so that the user does not have to both orient the camera and make a separate finger motion or other action to "fire" the camera. To guard against the automatic image capture function being activated inappropriately (for example, if the camera is waved in a random fashion over a target, it is possible that for a brief instant, the camera lens will be positioned within range to result in automatic image capture), which could result in an unacceptably blurry image with most cameras, the automatic mechanism described could have a lock-out feature that requires the position of the camera to be held constant for a minimum amount of time (e.g. 2 or 3 seconds, for example), before the image is automatically captured. Alternatively, a voice activated trigger could be utilized, so that a user, upon being informed by the guides that the camera is within the acceptable range of orientation, could issue a verbal command that, via voice recognition software, fires the camera.

Alternatively, the camera could use image analysis software that calculates when a maximal length of the target object is within view, based on the "visible" borders of the reference standard/target (i.e. transitions in pixel-color between the reference standard and/or the target object, and the latter's background. For example, the borders of a target object, when viewed against a background colored starkly differently than the color of the target object, can be easily discernable by object recognition software which recognizes the transition in pixel color at each surface of the border between the target object and the background. Similarly, the maximal length in any direction, and/or net visible area, of the target object can be calculated by image analysis software in real-time. When the object recognition software detects a maximal linear length (e.g. diameter) or area, then, the automatic picture-capture mechanism is activated. This can be used with or without the lock-out function described above, to prevent "accidental" activation resulting in blurry images.

Various data may be recorded at the time of image acquisition. Data may be inputted by the user, accessed from other hardware devices housed in the same device as the image acquisition means, or accessed from remote sources that are in communication with the device housing the image acquisition means. For example, the exact time (calendar and horologic) that an image is acquired can be recorded from a chronometer having any range of desired accuracy, for example resolution of tenths to hundredths of a second. Time data may consist of the absolute time, or the elapsed time between the acquisition of two images. Likewise, location (geocoding) data can be accessed from the smartphone's GPS or mapping programs. Temperature data could be accessed from instruments or a weather database in communication with the device or on-board thermocouples. Additionally, data included within the image may be separately analyzed, decoded, and recorded in conjunction with the image. For example, if a QR tag or other machine-readable label is included in the image, this information can be analyzed by the proper image analysis means and stored with each image. Another example of data that can be captured with each image is the exact time that a single picture frame was taken, relative to the exact time that other picture frames in a series (e.g. video) were taken. The time elapsed between two different frames of a target that has moved away from the camera along a constant, linear trajectory) can allow the distance that the target has travelled to be calculated.

Image Analysis.

The image analysis steps of the invention comprise a display means, a graphical user interface, computer software programs which perform various processes, as set forth below, and a processor means for carrying out the processes. The image analysis system may be configured in various ways, on various devices. It is appreciated that the image analysis processes of the invention can be implemented in myriad ways using a variety of software tools, hardware, and software-hardware interfaces, on a variety of operating system platforms and devices.

In the image analysis step, the image size of the target object and the image size of the reference standard object is determined. Once the image size of the reference standard object is determined, its degree of minification in the image can be calculated using its known dimensions, which are either drawn from a database or memory file, or which may be manually inputted by the user. Finally, using the minification of the reference standard object and the image size of the target object, the actual size of the target object is estimated, for example as set forth in Equation 3 above.

The basic process outlined above requires that the image size of both the reference standard and the target object be accurately measured. The first step in determining image size of an object is the delineation of the object in the image. This delineation is carried out by displaying the image for the user, and then, via a graphical user interface, allowing the user to mark the borders, endpoints, or other boundaries which define the measurement axis of interest. For example, if a linear measurement is desired and the reference standard is a pen of known length, the length of the pen in the image must be determined. To do so, the user will delineate a straight line segment defined by the two endpoints of the pen's long axis. This can be accomplished by any number of graphical user interface tools known in the art. For example, the image could be displayed on a computer monitor and the user could position a mouse over one end of the pen in the image, click to anchor a delineation point, and then repeat this process for the other end of the pen. In another example, the image could be displayed on a touchscreen and the user could mark the endpoint of the pen by a simple finger touch over the appropriate region of the image. Accurate delineation will be aided by allowing the user to move, rotate, and zoom in on the image and very precisely mark the desired endpoints, borders, or other attributes.

For those situations in which an area measurement is desired, the delineation process will encompass any means of tracing the borders of the reference standard and the target object in order to define their two-dimensional shapes. This can be accomplished in various ways, such as finger tracing the outlines of the object on a touchscreen, tracing the borders of the object with a pen interface, or the use of pixel selection tools which can differentiate objects based on contrast and/or color differences between the object and its background. If the desired measurement is an angular measurement, the features of interest can be traced or delineated by a series of points to define an angle or a curve, which can later be analyzed by protractor functions, curve fitting tools, or other such means. Alternatively, angle measurements can be made simply by using a protractor graphic positioned by the user such that it is superimposed over the target for facile angle measurement.

In certain embodiments of the invention, user delineation of objects in images is aided by a delineation icon. The delineation icon is a moveable, rotatable, and sizeable graphic which is overlaid on the image. The icon is then positioned and scaled and to the proper size. For example, when defining a linear segment, the icon might comprise a simple graphic comprising two endpoints, or two parallel "bars." i.e. line segments, which can then be independently positioned along the relevant axis of measurement of the object pictured in the image. For example, if the dimension to be delineated is the image height of a standing person, the two endpoints or bars could be positioned at the tip of the head and the bottom of the feet of the pictured person. An exemplary delineation icon for linear measurements is a "caliper icon," a graphical representation of an actual caliper, consisting of two parallel arms that can be positioned along a linear axis. Alternatively, the delineation icon may represent a shape, of either fixed or changeable proportions, such proportions corresponding to the geometric shape of an object pictured in the image. Any two-dimensional shape may be utilized depending on the nature of the objects to be delineated. For example, if the object to be delineated is a round coin, the image to be analyzed could be overlaid with a circular delineation icon. If the object to be delineated is a bank note, a rectangular delineation icon could be utilized.

The delineation icon may be defined or selected by the user at the time of image analysis. For example, a dropdown menu can be displayed, presenting the user with various delineation icon options. For example, generic delineation icon choices such as linear, caliper, circle, square, rectangle, etc. may be presented and selected. Alternatively, delineation icons representing specific objects may be listed for the user, which is especially useful in the delineation of reference standard objects. For example, options such as "United States Quarter," "8.5×11 inch paper," "business card." "10 Euro note," "AAA battery," etc. may be presented and selected. Upon the user's selection of a particular icon, a sizable, rotatable, and moveable graphic corresponding to the shape and proportions of the selected object is displayed, and the user may then position this icon over the object pictured in the image. When selection of a specific delineation icon for delineation of the reference standard object is performed, the actual dimensions of the corresponding object can also be retrieved from a memory file or database and used in subsequent calculations of minification. For example, if the selected object is a United States quarter dollar coin, the coin's known diameter (24.26 mm) and area (462.42 mm2) can be retrieved upon selection of this object as a reference standard.

In those embodiments of the invention which are carried out on a smartphone or other touchscreen enabled device, the delineation icon may be positioned and sized using simple finger movements and pinch-zoom movements. In other embodiments, the delineation icon may be controlled by a mouse or other user interface tool, including trackerballs, joysticks, or voice activated commands. For example, voice controlled graphical user interfaces known in the art, such as Hippo Mouse Grid™ and SpeechVibe™ can be employed to control the position and sizing of the caliper tool, with commands such as "move caliper one inch to the left." "open caliper," "close caliper one millimeter," etc.

Object recognition software may also be utilized to automatically delineate the endpoints or borders of the target object. Object recognition (sometimes called machine vision) software can delineate objects in an image using color and pattern recognition algorithms, as well as other tools. Object recognition methods and software known in the art are readily configured to recognize any number of objects in two-dimensional images, for example human figures, blood vessels, cars, and defects on microchips. Exemplary object recognition software includes programs such as SpikeNet Vision™, Pattern Recognition Application Programmers Interface (open source), Libsift (open source), Java Vision Toolkit (open source), and Imagu™. Object recognition software modules programmed to recognize items of interest could be included in software programs utilized for the image analysis steps of the invention.

Once the endpoints, area, or other desired attributes of the reference standard have been delineated, the size of the delineated objects in the image can then be measured. In some embodiments, the measured image size will correspond to the displayed size of the image, or even its size on a printed image. In most cases, it is preferred that the endpoints or borders delineated by the user on the display means are mapped onto the original image file, which will often have higher resolution than the display means, for example, if the display means is a small screen on a mobile device. Additionally, if delineated line segments or other regions are mapped to the image file for measurement of image size, the size of the image in the display may be dynamically zoomed in and out for fine resolution of endpoints and borders, which is not possible when comparing the displayed size of imaged objects, as the resolution must remain constant. Additionally, if optical functions for the measurement of distance and/or velocity, as disclosed herein, are utilized, these will generally be based on image file size, not display size, and thus image file size must be utilized. However, because it is the relative size of the target object and the reference standard in the image that provides the critical means of estimating the actual size of the target object, it is not essential that the actual size of the pixels or pixel density be known, and a displayed image may be used if zooming or the use of secondary optical equations are not required.

The image size of the delineated objects can then be measured using any number of standard pixel counting software tools. For example, the National Library of Medicine Insight Segmentation and Registration Toolkit (ITK) is an open-source, cross-platform system that provides developers with an extensive suite of software tools for image analysis (available at ITK.org). Exemplary tools for image selection, allowing, for example, the delineation of the endpoints or borders of an item in an image include Pixelmator (by Pixelmator), the GNU Image Manipulation Program, and Magic Selection (by Edouard Ciapkis). Exemplary pixel rulers for measuring the linear dimension or area dimensions of objects in an image include Pixel Ruler 4.0 (by MioPlanet), Free Ruler (by Pascal), Pixus (by Adobe) and Measure Pixel Area (by Blickfeld7).

Once the image sizes of the target object and the reference standard object are known, and the actual dimensions of the reference standard object have been retrieved or inputted, the actual size of the target object may be calculated. For example, the relationships described in Equations 2 and 3 may be used to estimate actual size of the target object. It is understood that algebraic equivalents of these equations may also be utilized, and the mathematical relationship between actual size and object size can be expressed in various ways, for example, inches actual size per pixel, square mm of actual area per pixel, inch of actual length per inch of image length, etc. The processes described above are illustrated and exemplified in Example 1.

Preferred implementations of the invention allow the user to select any number of relevant units, for example inches, feet, millimeters, centimeters, meters, degrees, radians, etc. Unit conversion is carried out using standard processing steps and algebraic equations known in the art for the interconversion of measurement units, such that stored reference standard object dimensions, inputted custom reference standard dimensions, measured angles, and other inputs may be readily converted by software for use in the calculations of the invention, for example actual size calculations (e.g. as in Equation 3), distance calculations (e.g. as in Equations 7 or 10) and any other calculated parameter, and such that calculated outputs may be displayed in any interconvertable unit selected by the user.

In calculating the size of the object, the image analysis means can utilize various correction factors to account for distortions of the image which might otherwise introduce errors into the measurement, for example, lens distortion. For example, embodiments of the invention may be carried out on a smartphone. The wide angle lenses used in most smartphone camera modules are sometimes prone to a phenomenon called "barrel distortion," in which the magnification of the image is not homogeneous throughout the entire field of view of the camera. Various image processing programs known in the art can be used to correct the image prior to its use in the image analysis step, for example programs like PTLens™ and PTAssemblor™. Alternatively, a matrix of correction factors which correspond to the degree and directionality of distortion for a particular camera lens can be stored in the image analysis means and then applied to the measurement calculations after mapping the location of the measured item to account for the distortion expected in that portion of the image. Distortion near the edges of an image can be minimized by instructing the user to position the camera such that objects are centered in that section of the camera's field-of-view with the least distortion. For example, if the user is acquiring images of a person, the user could be instructed to acquire the picture with the camera positioned such that the center of the field-of-view is aligned at the mid-height of the person being photographed. A displayed crosshairs or other aiming guide graphic centered in the camera's field of view may be employed. In some embodiments, the bubble level graphic, discussed above, is translucent and is displayed in the center of the screen, while the user is instructed to center the bubble over the target object, helping to ensure that the image is acquired in the least distorted portion of the camera's field of view. Alternatively, if distortion from the optics system of the camera is known to occur and is localized to the periphery of the camera's field-of-view, the software programs of the invention could be configured to crop the camera's field-of-view preview such that the user is only able to photograph objects within the camera's least distorted field-of-view. Another type of distortion that may occur when capturing images is called "shadow distortion," where the edge of an item is difficult to delineate due to shadows. Shadow distortion may be corrected for using any number of image editing software tools known in the art.

"Angle distortion" or foreshortening will change the apparent size of an object in an image if its axis of measurement is not perfectly parallel to the camera lens at the time of image acquisition. In those instances where an object being photographed is of known shape, i.e. a shape having fixed proportions, the object's shape in the image will deviate from its known shape as a function of the object's deviance from parallel to the lens. For example, a circular coin will appear as a perfect circle in an image taken of the coin when the lens is parallel to the face of the coin, but in an image taken when the lens is not parallel to the face of the coin, the coin will appear slightly oval shaped. For any given optical system of fixed properties, the degree of image shape distortion of an object from its known proportions can be correlated to the deviation of the lens from parallel to the object at the time the image was taken. This deviation can then be accounted for during the image analysis step and image size calculations can be corrected accordingly. For example, trigonometric functions may be used to determine the degree of alignment error and the resulting degree of distortion in the image. Similarly to the above, inclinometer data may be recorded simultaneously with image capture. This data will allow an assessment of whether the image capture means lens was in the right orientation at the time of image capture. For example, the inclinometer data may indicate that an image was captured with the lens in an imperfect orientation. For example, the inclinometer data may indicate that the lens was tilted three degrees from vertical when a perfectly vertical orientation was desired. Using this information, the degree of expected image size distortion can then be accounted for during the image analysis step and image size calculations can be corrected accordingly.

Additionally, the image analysis means can be utilized to integrate measurements from multiple images. For example, most natural items such as body parts, organs, and other biological features do not have regular geometrical dimensions (i.e. they are not perfectly spherical, cylindrical, cubic, etc.). In such cases, a single two-dimensional image cannot capture those aspects of the item which are outside the plane of the photograph. In such cases, it may be advantageous to take multiple images of the item from different vantage points so that multiple attributes of a three-dimensional item can be measured. The image analysis means can be programmed to analyze and integrate measurement from multiple images in order to calculate desired parameters. Alternatively, given the challenge of simultaneously aligning a hand-held camera device, a reference standard, and the item to be measured, a certain degree of error may occur due to one or more elements being out of plane. In some cases, it may be advantageous to have the user capture more than one image and then configure the image analysis means to average the measurements, or otherwise statistically analyze the results (for example, to remove outliers or provide the user with information about the variability of the set of measurements).

In some embodiments of the invention, the image analysis step is carried out on the same device as the image acquisition step. Alternatively, the two steps can be separated such that image acquisition takes place on one device and the images are then transmitted, uploaded or otherwise acquired by the device on which the image analysis step is carried out. If desired, image analysis results can then be transmitted back to the device on which the original image capture step was carried out. For example, a user can utilize a smartphone equipped with an image acquisition means to take a photograph of a reference standard on or next to a body part, wound, lesion, or other medically relevant feature. The image can then be transmitted to a second device off-site, where size estimation of the feature is calculated by a trained professional. This size calculation can then be transmitted back to the user, either manually (for example, by a physician reviewing the image), automatically, or upon the user's request.

DETAILED DESCRIPTIONS OF THE EMBODIMENTS

Mobile Device Application

The methods of the invention may be carried out using a mobile device into which a software application has been loaded. The software application is configured to engage various hardware components which are also housed within or controlled by the device, including a digital camera with preview field display, an inclinometer, and a graphical user interface such as a touchscreen.

Figure 5:
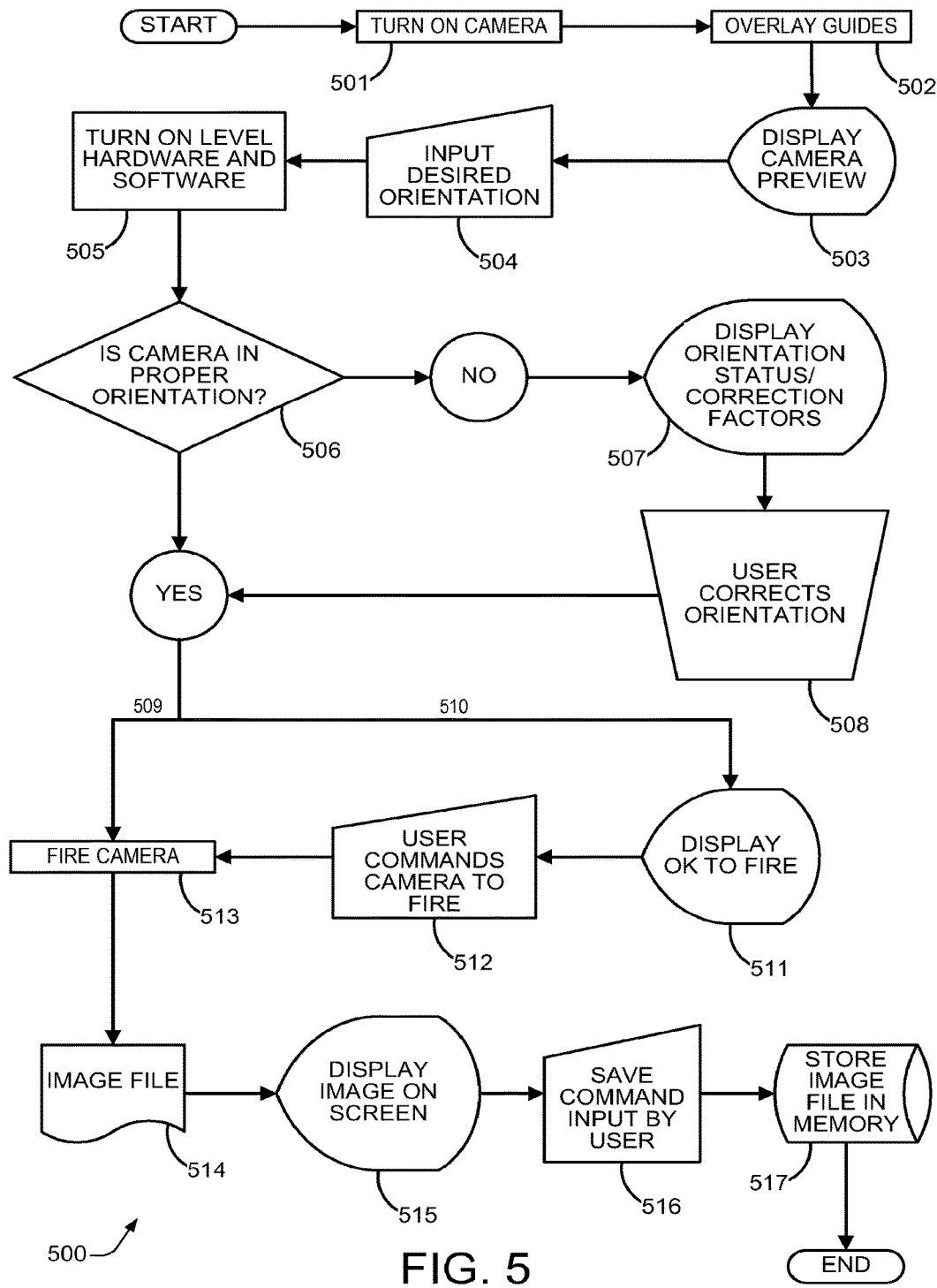
FIG. 5. This figure depicts a software diagram illustrating a potential architecture for a software application designed to implement the image acquisition step of the invention.

The first function of the software application is to aid the user in acquiring an optimal image. FIG. 5 is a software flowchart describing the process of acquiring an image. Upon initiation of the software application, the device's camera is turned on (501). Custom graphics are dynamically overlaid upon the camera preview field of view (502). These custom graphics can include sights and guides to aid the user in aligning the camera, information about the orientation status of the camera, and touchscreen-responsive buttons allowing the user to select their desired orientation and make other inputs. The graphics can also include written instructions directing the user to position a reference standard on, next to, or otherwise in-plane with the item to be measured. The camera preview field of view and custom graphics are then displayed on the screen of the device for the user (503). The user can then select the desired orientation for taking the photograph such that the camera lens is aligned parallel to the axis of measurement on the item to be measured. In most cases, the desired orientation will be either vertical or horizontal. The user inputs their selected orientation (504) by an input means, such as a screen button or, if a voice recognition user interface is employed, by voice command.

When the desired orientation is selected, the software application then engages the level-sensing means of the device (505). The level sensing means of the device can comprise, for example, an inclinometer hardware element in combination with a software program that converts data from the hardware element into information about the orientation of the camera in space. If vertical orientation is desired, the level-sensing means will act as a plumb, determining the orientation of the device relative to the axis of gravity. If horizontal orientation is desired, the level-sensing means will act as a surface level which determines the device's orientation relative to the axis which is horizontal to gravity.

If the device's lens is not within an acceptable orientation (i.e. not sufficiently close to parallel to the axis of measurement, then the software application will display the orientation status and may also display correction directions (507). Orientation status may be displayed as the degree to which the device is off-axis, and this information can be presented as numeric data (e.g. degrees from vertical) or graphically (e.g. depicted as bubbles in a bubble level). The information may also be displayed by color-coded signals, such as bars bordering a crosshairs graphic, indicator lights, or a tinted overlay of the object at the center of the viewfinder. Color coding, can be used to indicate the degree of tilt, for example red can indicate unacceptable degree of tilt, yellow can indicate an orientation that is close to acceptable, and green can indicate acceptable alignment. For example, see FIG. 3 which depicts exemplary visual guides for alignment of the camera. The degree of acceptable alignment can be preselected by the device, or may be changed by user input. Correction directions can be displayed by the device in order to help the user orient the camera properly. For example, a prompt such as "tilt camera forward" can be displayed in writing or as an audio clip over the speakers of the device.

Once the camera is in the proper orientation, it may be configured to fire automatically (509). Alternatively, a signal that the camera is in the right orientation can be displayed on the screen (e.g. "OK to fire camera" printed on screen, or a green light) or communicated to the user by an audio signals (e.g. an audio clip of a voice saying "OK" to take picture" or a beep).

When the camera is fired, a digital image composed of pixels is acquired and may be stored in the working memory of the device, stored in the long-term memory of the device, or transmitted to another device or location. The software application may display the captured image on the screen (515). Information about the orientation at the time the photograph was acquired can also be displayed, allowing the user to assess whether the image will be useful for accurate calculation of the desired measurement. Upon reviewing the image, the user can then decide to delete or save it, and if save is selected, the image can be stored in the device's memory (517).

Figure 6:
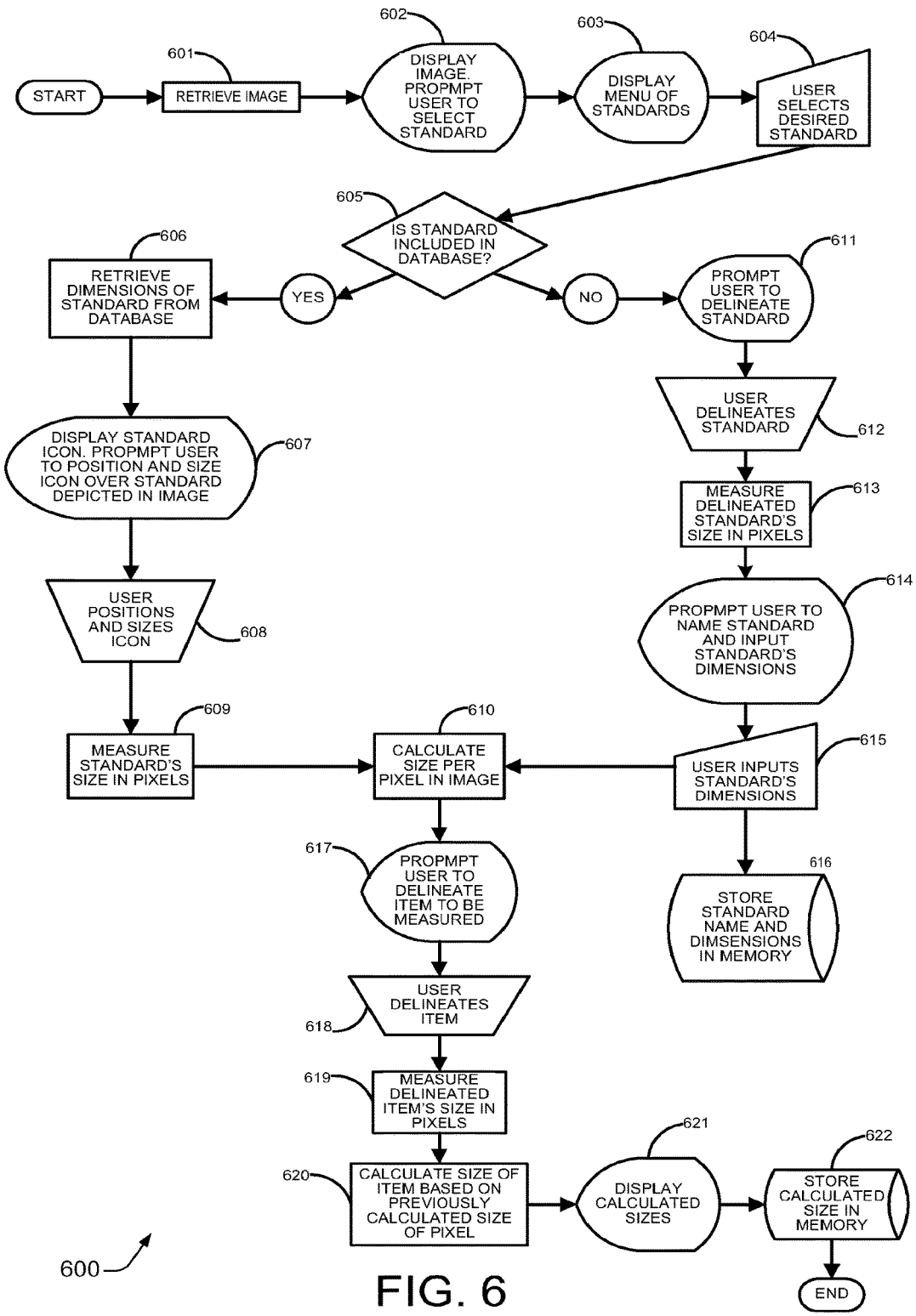
FIG. 6. This figure depicts a software diagram illustrating a potential architecture for a software application designed to implement the image analysis step of the invention.

Image analysis takes place subsequent to image acquisition. Image analysis can be performed on the same device which was used to acquire the image, or may be carried out on another device. FIG. 6 depicts a software flow diagram for the image analysis step. Upon initiating the image analysis program, the desired image file is accessed and displayed for the user (602). The user is then prompted to select a reference standard. A menu of reference standards is then displayed (603). The user can pick a reference standard (e.g. United States quarter-dollar coin, Marlboro cigarette, etc.) from the menu. Upon selection of a known standard, the software application will retrieve the known dimensions of the reference standard from a database (606). The database of reference standard dimensions can be stored in a memory file housed in the device, or can be accessed remotely.

Upon selection of a known standard, an icon in the shape of the standard is displayed on the screen (607). For example, if the selected reference standard is a round coin, the icon displayed on the screen will be circular. The user is then prompted to position the icon directly over the reference standard pictured in the image and to size it so that it exactly fits over the image of the reference standard (608). For example, if the chosen reference standard is a coin, then the user will position the circular icon over the coin and then shrink or expand it so that it is correctly positioned right over the image of the coin. For precise fitting, it would be useful to allow the user to zoom in on the image so that very precise placement is enabled. Zooming, sizing of the icon, and positioning of the icon on the screen may all be enabled using touchscreen gestures on a touchscreen interface, or other graphical user interface, such as a mouse.

Once the icon has been correctly positioned over the reference standard, the user can push a button or issue a voice command that prompts the software application to measure the image size of the reference standard based on the endpoints or borders delineated by the icon (609). For example, if the reference standard is a coin, the software application, using the properly positioned and sized pen icon as a guide, will employ a ruler tool to measure the size of the coin's image, for example, the diameter of the coin. Then, the software application will calculate the relationship between the reference standard's image size and its actual size (610). For example, if the reference standard is a coin, the number of pixels per centimeter, inch, etc. will be determined using the pixel measurement of the coin's image diameter (609) and the known diameter of the coin retrieved from the database (606).

Returning to the earlier step of selecting a standard (604), if the reference standard is not a standard whose dimensions are stored in the database (605), then the user may utilize a custom standard. When presented with a menu of standards (603), the user may select "custom standard" or some such option which signals the software application that a new standard is to be defined. The user is then prompted to delineate the standard in the image (611) using graphical selection tools. Once the user has delineated the required endpoints, borders, or other attributes of the reference standard object in the image, the software application, using the delineation markers supplied by the user, will utilize a ruler tool to measure the image size of the reference standard (613). The user will then be prompted to input the known dimension of the standard (614), and upon the user's input of the standard's actual dimensions ((615), the software application will then calculate the relationship between the reference standard's actual size and its image size (610), for example, pixels per inch of actual size, etc.

Once the relationship between the actual size and image size has been calculated using the reference standard, then the size of the target object pictured in the image can be measured. The user is prompted to delineate the endpoints, borders or other desired attributes of the target object, using graphical selection tools (617). Once the endpoints, borders, or other desired attributes have been delineated by the user (618), the software application, using the delineation markers provided by the user, utilizes a ruler tool to measure the image size of the target object (619). Using the image size of the target object and the previously calculated relationship between actual size and image size (610), the actual size of the item is then calculated (620), displayed for the user (621), and then the measurement data, as well as the image can be stored (622).

Stored data can be handled in many ways. It can be displayed graphically, it can be analyzed on board the mobile device and presented in comparison to other like data. Data can also be transmitted to a remote computer, in encrypted form if desired, for storage and analysis. Analyzed data may be transmitted back to the user along with comparison data for like measurements pertaining to previous values for the same individual other people (e.g. change in the size of a skin mole), or, comparison data from other people in some way similar to (or unrelated, if desired) to the user, as well as other information relevant to the acquired measurement.

On-Screen Calibration.

In the previously described embodiment, the relationship between image size and actual size is calibrated by delineating the reference standard in the image as part of the image analysis step. In an alternative embodiment, the reference standard can be delineated in the image at the time of image acquisition. At the time of image acquisition, the user may select the reference standard from a drop down menu on the device. Upon selecting the desired reference standard, the software application will display in the camera's preview field-of-view an icon having the same shape and proportions as the reference standard selected. For example, if a round coin is to be used as the reference standard, a circular icon will appear, overlaid upon a portion of the camera preview field. The user is then prompted to position the icon so that it perfectly covers the item in the camera preview field. Proper positioning can be attained by moving the camera closer or further from the reference standard. Graphical user interface tools can also be employed to make the icon moveable around the screen and sizeable by shrink and expand gestures. Once the icon is in the correct position, the camera can be fired and an image acquired.

The advantage of using this method is that the act of aligning an icon over the reference standard, in addition to delineating the reference standard, also serves to align the camera properly at or near parallel to the axis of measurement. For mobile devices which are not equipped with an inclinometer, this alignment using icons as a sight can help the user attain the proper orientation of the camera for accurate measurements. Subsequent image analysis is simplified because the reference standard has been previously delineated. Calculation of the relationship between actual size and image size, delineation of the target object, measurement of the target object, and calculation of the target object's actual size is carried out as described in the previous embodiments.

Fixed Distance Measurements.

In some cases, it will be practical to take repeated images, while the camera remains at a fixed distance from the objects being measured. In such cases, calibration of the camera using a reference standard can be performed just one time, and the resulting pixels per unit measure value can then be applied to any image taken using that same camera (or substantially identical equipment) from the same distance. Advantageously, this eliminates the need for a reference standard to be included and positioned in each photograph. This method is especially amenable to the use of cameras mounted on tripods or other solid supports.

Medical and Research Applications

The methods, devices, and computer program products described herein are amenable to many different research and medical contexts. The invention is especially useful for remote medicine applications, allowing a patient to submit medically useful information to a physician at a different location. For example, the invention could be utilized in telemedicine and military battlefield medicine situations. Additionally, it allows physicians to circulate the images to specialists or to other physicians for second opinions. The remote medicine applications of the invention can be used for the measurement of moles, lesions, rashes, wounds, swelling, and other visible conditions. Depending on the type of condition being assessed, the image analysis software of the invention can be configured to measure any relevant diagnostic properties of the condition, for example, the total area covered by a rash, the average size and number of lesions, and the spacing between lesions. The invention enables accurate serial measurements of the same region of the body so that the progression of a condition can be accurately monitored, allowing for diagnostic and prognostic determinations without the need for repeated visits to a physician. It is understood by one of skill in the art that all medical embodiments described herein are applicable to analogous veterinary applications as well. Additionally, researchers studying any number of conditions or physiological parameters may utilize the medical embodiments of the invention.

In some cases, the patient or research subject may perform both the image acquisition step and the image analysis step, and transmits the resulting measurements to the physician. For example, in certain contexts such as measurement of the genitals, the patient or research subject may prefer to transmit only their measurements and not images of their private regions. However, in many contexts, it will be preferred that the research subject or medical patient transmit the image of the body part or afflicted region (with reference standard object) to the researcher or medical professional. First, this allows a trained professional to perform the delineation steps, ensuring consistent and higher quality measurements, or it allows the trained professional to double check patient or research subject delineations. Secondly, the burden on the patient or research subject is lessened by requiring only that they acquire an image of a reference standard object held on or against the body part or feature of interest (or, for gait speed and other velocity or movement related measures, a video of the patient walking, as discussed below) and then transmit this image to a lab or physician, leaving the analysis steps to others. This simplified means of remotely collecting data allows for convenient, private, at-home data collection as well as better patient/subject compliance and more consistent image analysis. Additionally, the transmission of images or videos provides the researcher or physician with a richer data set than that provided by simple raw measurements and allows for selection of any point within the video for analysis of gait. Additionally, as secondary features may be assessed in addition to the measurements of interest, such as, for example, the appearance of the subject as he/she is walking, specific features of their gait, gait pattern, acceleration throughout the walking exercise, speed and acceleration of any portion of the walked distance.

Special reference standards may be employed for the medical applications of the invention. For example, stickers of known dimensions may be utilized in proximity to a rash, lesion, mole, wound or other feature being measured. Reference standard stickers of any shape, for example, a bar (rectangle), square, or circle may be utilized. Preferred reference standard stickers will be of a color that contrasts with human skin and therefore is easily delineated in an image. Materials that are not too highly reflective may be utilized in order to avoid glare or other visual distortions from a camera flash, and/or, to optimize visibility, even in limited lighting. Stickers may be made of materials that are of limited flexibility, in order to hold their shape and not deform to the contours of the body. In some embodiments, it will be desired to measure the profile (i.e. the height) of a raised region of the skin, such as a mole or plaque. In such cases, a special reference standard sticker comprising a feature or region of known thickness (i.e., height, when viewed laterally) may be used. For example, such a sticker might comprise an adhesive-backed foam square having a known thickness, for example in the range of 0.5-3.0 mm. The sticker is placed next to the feature of interest and the two are photographed from a lateral view, so that the height of the reference standard portion of the sticker may be delineated and the height of the feature may be delineated and calculated. Given the small profile of most such skin features, the macro lenses or other optics for close-up views may be employed to increase resolution and accuracy. The raised portion of the sticker may be colored in such a way that it vividly contrasts with the color of the adhesive base in order to facilitate its delineation during the image analysis step.

Reference standard stickers will preferably comprise adhesives which are compatible with skin, such as non-irritating hypoallergenic adhesives, such as the acrylate, methacrylate and epoxy diacrylate adhesives known in the art for use in bandages and wound dressings. Generally, it is preferred that reference standard stickers for use on skin will adhere only lightly, and may be readily removed after acquisition of the image. Alternatively, a sticker with greater adhesive sticking power and durability may be applied and left in place for long periods of time if periodic monitoring of an afflicted area is desired. Stickers may be made of a material comprising a writable surface or surface region (for example, writeable with a permanent marker), allowing the recordation of additional information in images In addition to imaging and measuring moles, lesions, rashes, wounds, swelling, and other visible conditions, diagnostic embodiments of the invention may utilize secondary inputs by the user to aid in assessment of the condition. The measurement methods of the invention could be integrated into telemedicine, and/or differential diagnosis computer programs known in the art, such that relevant information is requested from the user depending on the symptoms described, and the user could be instructed to take images, including images that allow specific measurements, relevant to the putative diagnosis. For example, when assessing a dermatological condition, the user may be asked to supplement the measurement data acquired by the software (e.g. area, average lesion size, spacing between lesions, etc. and/or the degree of change in such qualities over time) with other information, such as the surface qualities of the rash (macular (smooth) vs. papular (raised)), itchy vs. non-itchy, location on the body, blanching when touched vs. non-blanching, the user's recent exposure to any biological or chemical entities, and so on. Additionally, acquired images of the dermatological condition may be analyzed by image analysis software as known in the art to determine the color of the rash or lesion, for example the degree of rubor (redness), which such quality may be diagnostic. Color analysis may be aided by the use of a reference standard having a consistent and known color (for example, United States paper currency), which allows for color correction using software tools known in the art. The measurement and secondary inputs may then be assessed by a differential diagnosis computer program. Drawing from a database, the user or reviewing medical professional may also be provided with a proposed treatment for each putative condition diagnosed by the software.

The remote medicine applications of the invention further encompass real-time physician-patient interactions, for example internet video conferencing. During the video conferencing session, the physician can request that the patient hold reference standard objects against the body and hold poses in the proper orientation for proper image acquisition. Still frames from the video session can then be extracted and measurement analysis can take place in real time. Alternatively, the entire video session can be saved and analyzed later, allowing post-hoc measurement of relevant features.

Ranking Statistics and Databases.

The software programs and methods of the invention further comprise a means of providing the user with statistical ranking information. Once the user has attained a measurement of interest, for example a medical parameter such as height, penis length, abdominal girth, gait speed, or any other parameter measurable using the methods of the invention, these measurements can be entered into "ranking equations" which compute the user's statistical rank within a defined population. So long as population statistics are available for the measure of interest, ranking equations are readily derived using common statistical methods of calculating percentiles and other comparative statistics. For example, a given population study may provide the population mean and the standard deviation from the mean for a measure of interest. From this information, a ranking equation providing a Z-score (a common measure of percentile ranking) can then be readily calculated using Equation 5.

$$Z = \frac{(x-m)}{sd}.\qquad\text{Equation 5}$$

wherein Z is the user's percentile ranking, x is the user's measured parameter, in is the mean population measurement derived from a population statistics, and sd is the standard deviation from the mean.

Ranking information may be calculated on the user's device, using ranking equations stored in memory or accessed from a remote site. Alternatively, the user's measurement and other demographic data may be transmitted to another site where ranking equations are applied to the user's numbers, and from which ranking information is subsequently transmitted back to the user. Ranking information may be displayed as raw numeric data or may be displayed graphically. For example, percentile data could be displayed within a chart, nonogram, table, graph or other graphical presentation of population statistics showing values associated with low, average, and high rankings, for example a height vs. age growth chart, a body mass index chart, etc.

The invention further encompasses the use of the software programs described herein to create a database of measurements and other user demographic data. Each user is requested to input or select (for example, from a dropdown menu) various demographic data, such as age, height, weight, ethnicity, nationality, health status, medical history, and other variables of interest or relevance to the measurement. This data, and the user's measurements are transmitted from the user's device to a central database and the transmitted data is added to the database. Such databases will have utility in multiple contexts, for example, marketing, medical, or research applications. For example, by providing a number of research subjects or patients with software programs enabling their mobile devices to make the measurement of interest, and requesting ancillary data be provided with the measurements, a large data set may be populated with measurements obtained from remote users. Accordingly, in one aspect, the invention comprises a method of creating databases by providing a plurality of users with software programs which enable their mobile devices to perform image-based calculation of a measurement of interest or the acquisition of images from which image-based measurement methods may be utilized to calculate a measurement of interest; and the subsequent transmission of such measurements or images obtained by the user, as well as any ancillary data, to a computer data storage means comprising a database.

Databases populated with user measurements may further be utilized for the generation of ranking equations, including the generation of ranking equations for various subpopulations. For example, a user may transmit to a computer storage means comprising a database a measurement of interest in combination with various demographic data, for example such as the user's gender, age, ethnicity, nationality. Upon receipt of this transmission by the computer data storage means, a database query is generated which retrieves mean and standard deviation data from the database, stratified by factors common to the user. For example, using a device enabled by software programs for image-based measurement of abdominal girth, a user could make an image-based measurement of her abdominal girth. Upon the user's input of her demographic data, for example indicating that she is a female North American resident of Latina descent, aged between 20 and 30 years, her abdominal measurement and this demographic data is transmitted to a computer data processing and storage means comprising a database. Upon receipt of this transmission, the database is queried to retrieve mean and standard deviation of abdominal girth for females, North Americans, Latinas, and persons aged between 20 and 30 years, and subsequently these retrieved data are used in formulating ranking equations and calculating the user's rank within each of the selected subpopulations.

In some embodiments, only the user's measurements (and any ancillary data) are transmitted to the database and the image from which the measurement was attained is not transmitted. When privacy and/or bandwidth considerations are important, such a configuration is preferred. However, in other embodiments, the user's images from which the measurements were attained may be simultaneously transmitted to the database, for example, where evaluation of the image by medical professionals is desired, or the accuracy of endpoint delineation is to be independently checked. Data transmitted by the software application may be encrypted by various means known in the art to assure privacy.

Pre- and Post-Surgical Measurements.

The invention provides a measurement tool for assessing size aspects of various body parts. For example, for patients contemplating breast augmentation surgery, the invention may be applied to measure breast volume or chest size. Such measurements can aid in physician and patient decision-making when surgery is contemplated. The invention is also useful for documenting pre-surgical features and post-surgical outcomes. Physicians report that patients are often unsatisfied with the outcome of reconstructive or other surgeries. Therefore it is important to attain accurate measurements prior to and after surgery so that an accurate and objective assessment of surgery outcomes can be assessed. The methods of the invention could be used to document, for both medical and/or legal purposes, actual before and after measurement prior to and after any reconstructive, plastic, or other surgery.

Penis Measurement and Urological Uses.

The invention can be utilized for measurement of the penis, including the penis in the erect, flaccid, and/or stretched states. In the diagnosis of various conditions such as Peyronie's Disease, chordee, and micropenis, the physician must be able to measure the length, width, size, angular dimensions, and other visible features of the erect penis. However, the clinical setting is typically not psychologically conducive to a patient's ability to achieve a full, natural erection. The invention can be utilized for the diagnosis of these and other urological conditions by allowing the patient to photograph their erect penis in the privacy of their own home, with a reference standard on or held against their erection. Non-erect penis measurement also has clinical significance, and the invention allows accurate measurement of the non-erect penis in privacy. The image can then be transmitted to a physician for image analysis of curvature (e.g. degrees of curvature, location of curvature, direction of curvature), length, and other attributes of clinical significance. When the angle of curvature is desired to be measured, a protractor guide may be superimposed over the camera viewfinder during either the image acquisition step, in order to help the patient align the long axis of the penis parallel to the ground, or during the image analysis step, allowing its placement in the best position to readily measure the angle of curvature. Additionally, urinary stones passed by a patient can be accurately measured.

Additionally, non-clinical penis measurements can be made utilizing the invention. It has been observed that males are often preoccupied with the size of their penises and how their measurements compare to those of other men. The invention provides a means for private and accurate measurements to be taken and for the user to compare the size of his penis with group averages.

Penis length measurement may be carried out as follows. A mobile device measurement software application as described herein may be adapted for penis measurement. The application would include instructions guiding the user to acquire an image of his erect penis while holding a reference standard of appropriate scale on or against his erection, such appropriate scale being of a size that can be readily and accurately resolved in an image of an erect penis, for example, an object of about one to a few inches in length, for example a coin (e.g. a United States quarter, a 1€ coin, etc.). It is understood that measurement may be accomplished by acquiring an image from any vantage point perpendicular to the long axis of the penis. However, for ease of use, a top view is preferred, because this allows the user to most conveniently hold and orient the mobile device in plane with their erection. Also, in the subsequent endpoint delineation step, the basal endpoint of the penis is easily defined in a top-view image by the location where the shaft of the penis meets the abdomen wall. An image of the erection and accompanying reference standard object is then obtained. Subsequently, the user delineates the penile base and tip endpoints on the captured image, calibrates using the reference standard, and attains an accurate measurement of penis length.

Penile girth (circumference) may also be estimated using the methods of the invention. In an image of the erect penis, for example a top view, the width of the penis may be measured. For example, width could be measured at the midpoint of the penis shaft. Alternatively, average width could be calculated by obtaining width measurements at various points along the penis shaft. Using geometry, simple estimates of girth can be made using the width measurement by assuming the penis is substantially circular, in which case the measured width will be roughly equal to the diameter of the circle and the estimated girth will be equal to the measured width multiplied by pi. Alternatively, circumference could be estimated using average allometric relationships between penile width, as measured from a certain perspective (i.e. a top view, a side view, or a bottom view) and penile girth. In such case, the relationship between penile width (for example, as measured from a top view) and penile girth is determined in a number of subjects to establish an average conversion factor. This conversion factor is subsequently utilized in the image analysis step of the invention, providing the user with an estimated penile girth by multiplying measured width by the conversion factor.

The software programs and methods of the invention further comprise a means of providing the user with statistical ranking information. Ranking equations, as described above, may be constructed for various populations of males. For example population statistics on penile dimensions are available from numerous published studies, for example, as described in Wessells, H., Lue, T. F.; McAninch, J. W. (1996). "Penile length in the flaccid and erect states: guidelines for penile augmentation". *The Journal of Urology* 156 (3): 995-997; Chen, J.; Gefen, A.; Greenstein, A.; Matzkin, H.; Elad, D. (2000). "Predicting penile size during erection". *International Journal of Impotence Research* 12 (6): 328-333; Wylie, K.; Eardley, I. (2007). "Penile size and the 'small penis syndrome'". *BJU international* 99 (6): 1449-1455; Ponchietti, R.; Mondaini, N.; Bonafè, M.; Di Loro, F.; Biscioni, S.; Masieri, L. (2001). "Penile length and circumference: a study on 3,300 young Italian males". *European Urology* 39 (2): 183-186; and Reece, M, Dodge, B., et al; Penile Dimensions and men's perceptions of condom fit and feel. *Sex Transm Infect* 2009; 85:127-131. Using data from such studies, or from databases compiled using data from other users, any number of accepted statistical methods known in the art can be used to construct ranking equations. Subsequently a user's ranking may be calculated for the user, providing him with comparative statistics.

Penile dimensions measured using image-based measurement methods of the invention, and ancillary demographic information, may be transmitted to a computer data storage means comprising a database to populate a database, as described above. Also as described above, a user may retrieve statistical information from the database, for example mean penile length, width, and girth statistics, stratified by demographic variables such as age, weight, nationality, ethnicity, etc. Corresponding ranking equations based on penile size data retrieved for each subpopulation may be used with the user's measured or estimated dimensions to calculate the user's penile size rank within each subpopulation, allowing him to compare his measurements to those of like men.

In some embodiments, only the user's measured penile length and/or estimated girth (and any ancillary demographic data) is transmitted to the database. When privacy and/or bandwidth considerations are important, such a configuration is preferred. However, in other embodiments, the user's image of his penis may be simultaneously transmitted to the database, for example, where evaluation of the image by medical professionals is desired, or the accuracy of endpoint delineation is to be independently checked. In all cases, data transmitted by the software application may be encrypted by various means known in the art to assure privacy.

Pediatric Measurements.

The invention further comprises the use of image-based measurement systems in the pediatric context. In one embodiment, the invention comprises a mobile device-based measurement system that allows the user to photograph a standing, lying, or prone child and assess the child's height. Weight and age of the child may be inputted, and using these inputs and the child's height, the software will access a growth statistic database and employ basic statistical methods to calculate the child's percentile in height and weight. Calculated percentiles may be displayed for the user in graphical form, for example as a data point on a growth vs. age chart, nonogram, graph, or table. Serial measurements at different time points may be stored to create a growth curve for the child. The software may further be configured to detect aberrations in developmental progress and alert the user of a potential condition that should be checked by health professionals.

Abdominal Girth.

The image-based measurement tools of the invention further allow for convenient, private, at-home measurement of abdominal girth. Abdominal girth is highly correlated with abdominal diameter, and both variables are diagnostic indicia of obesity and obesity-related conditions. For example, abdominal girth is highly correlated with cardiovascular morbidity from diabetes, for example as described in Risérus et al., Sagittal abdominal diameter is a strong anthropometric marker of insulin resistance and hyperproinsulinemia in obese men. Diabetes Care. 2004 August; 27(8):2041-6. Abdominal girth is a simple linear dimension that lends itself to convenient image-based measurement. For example, one measure of abdominal girth is sagittal abdominal diameter, a measure of the width between the patient's abdomen and back along the axis of the iliac crest. For image-based measurement of sagittal abdominal diameter, the subject is instructed to lie on their back, with a reference standard placed on, against, or otherwise near their body and in plane with the lens of the camera. Using a vertically oriented camera lens, an image is acquired of the patient's abdomen from a lateral perspective. The image is analyzed using the methods disclosed herein to measure the patient's sagittal abdominal diameter. As described above, measurements calculated by the user, images acquired by the user, and/or ancillary data may be transmitted to a third party for evaluation or may be transmitted to a database. Ranking may be calculated for the user, and serial measurements over time may be attained and analyzed to monitor weight loss or gain.

Color and Other Spectroscopic Measurements.

Images acquired for measurement data may also be utilized for measurement of secondary factors. For example, in images acquired for medical measurement purposes, the color or other spectroscopic qualities of the object or feature being photographed may be of clinical significance. In the case of color, it will be useful to utilize measurement reference standards having both a known size and a known color. Using the reference standard as a guide, the true color of the feature being imaged can then be ascertained using color correction software known in the art, for example iCorrect™ (by Picto Color Software) or Magic Bullet Colorista™ (by Red Giant). Alternatively, the measurement methods of the invention can be applied to images acquired in wavelengths outside the visible spectrum, for example images acquired using infrared or ultraviolet cameras. Likewise, the visible color of a lesion may serve as an index of heat or thermal properties of the target region. Exemplary methods of assessing skin conditions using hyperspectral aspects are known in the art, for example as described in U.S. patent application Ser. No. 11/464,838 or U.S. patent application Ser. No. 12/471,141. Such methods could be combined with the measurement tools of the invention to assess and monitor size of skin features, yielding richer diagnostic or prognostic data.

Distance Measurements.

The methods disclosed above are directed to the measurement of the dimensions of a specific item. Also provided herein are methods for measuring the distance between a camera and a reference standard object located at an unknown distance from the camera. As set forth above, the further an object is from the camera, the smaller it will appear in an image. Assuming the optical properties of the camera's lens system are fixed and remain constant, an object's image size will decrease by a predictable amount as its distance from the camera increases, the relationship between an object's minification (actual size relative to its image size) and its distance from the camera depending on the particular optical properties of the imaging system, for example focal length, angle of view, and other parameters of the camera.

When the optical properties of the imaging system are known, then predictable relationships between image size of a photographed object, the object's actual size, and the object's distance from the camera may be applied to compute the predicted distance of an object from the camera, using its measured image size and the object's actual size. For example, depending on the focal length of the lens, size of the image capture sensor, and pixel density of the sensor, various optical properties of the camera are fixed and known, for example the vertical and horizontal angle of view of the camera lens and the maximal horizontal and vertical image pixel size of images captured by the camera. Using these properties of a given camera system, and observed values of minification or magnification, various optical relationships and equations known in the art may be applied to compute the predicted distance of an object from the camera, for example as described in Ray, S., Applied Optics, Third Edition, Focal Press (2002); Hecht, E., Optics, 4$^{th}$ Edition, Addison-Wesley (2001); Keating, M., Geometrical, Physical, and Visual Optics, 2$^{nd}$ Editions, Butterworth-Heinemann (2001).

For example, the angle of view and maximal image dimensions of a camera are typically available in the camera's published specifications, or may be readily derived by one of skill in the art using standard published specifications. From these values, and measured image size of a reference standard object, the linear dimensions of the object may be calculated. First, the angular size of the object ($\theta$object) in the image (in radians) is calculated using Equation 6, as follows:

$$\theta\text{object} = \frac{\text{image size}}{\text{maximal image size} \times \theta\text{max}} \quad \text{Equation 6}$$

where image size is the image size (in pixels), of an object wherein the object's linear axis of measurement is aligned with a selected axis of the image (either vertical or horizontal), maximal image size is the image's maximal size along the selected axis (in pixels), and $\theta$max is the camera's angle of view (in radians) along the selected axis. Once the angular size of an object in an image has been calculated, the distance of the object from the camera may be calculated using Equation 7, as follows:

$$\text{Distance} = \frac{(0.5) \times \text{actual size}}{\text{Tan}(0.5 \times \theta\text{object})} \quad \text{Equation 7}$$

Where actual size is the actual size of the object along the selected axis of measurement, and $\theta$object is the previously calculated angular size of the object in the image. Distance from the camera and the object's actual size may be in any units, so long as the same units are utilized for both. Equation 7 may also be approximated as Equation 8, as follows:

$$\text{Distance} = \frac{\text{actual size}}{\text{Tan}(\theta\text{object})} \quad \text{Equation 8}$$

wherein this approximation typically results in errors of less than 10% for objects of smaller angular size (e.g. less than 30 degrees or 0.58 radians).

Figure 8:
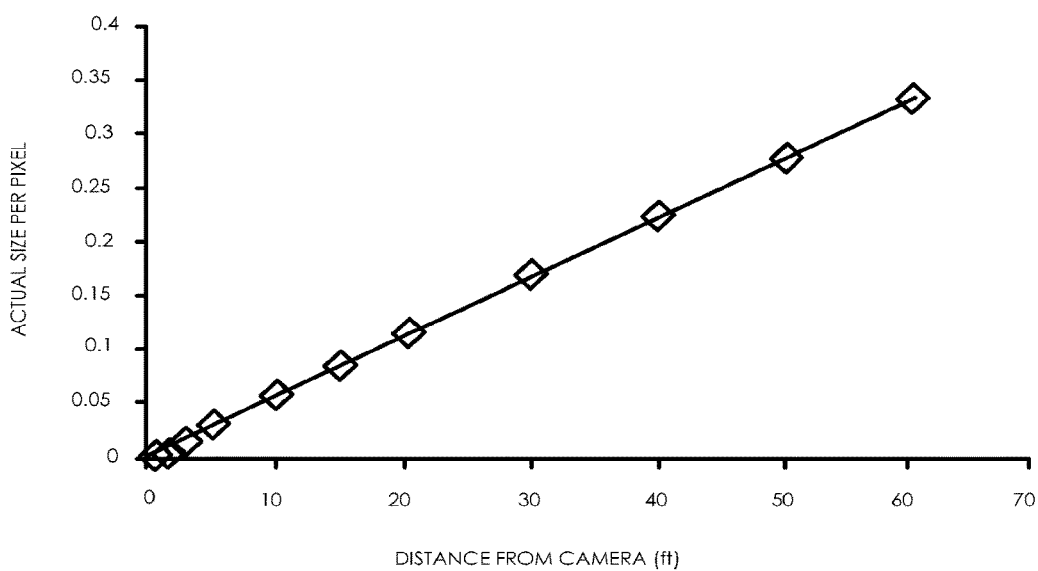
FIG. 8 This figure depicts a minification Distance Function that was derived by photographing three objects of varying height (a US $20 bill (length=6.14 inches), a plastic bin (height=15.5 inches), and a car (height from ground to roof rack=71.5 inches)) at various distances from a digital camera, ranging from 1 to 60 feet. The digital camera employed was the standard camera module of an Apple iPhone 3G. The height of the items in the resulting images was measured using Photoshop CS3. The actual height of each item was divided by its size in each image, and this value was plotted against distance from the camera to generate a linear minification vs. distance function.

If the optical properties of the camera are not known with precision, the relationship between distance from the camera, a reference standard object's actual size, and its image size may be empirically calculated. The relationship will hereafter be referred to as the "Distance Function." The Distance Function for a specific camera or camera type can be derived by photographing an object or objects of known size from various known distances. Using the known size of the object or objects photographed, and the delineation and pixel ruler methods described previously, the user can then determine the degree of minification of the object in each of the images captured at the various distances. The Distance Function is then created by plotting the Minification of the photographed object(s) in each image against the object's known distance from the camera at the time each image was acquired. Using standard statistical techniques and curve fitting methods known in the art, a mathematical relationship describing the Distance Function may be then calculated from the observed data. FIG. 8 depicts an exemplary distance function.

Once the Distance Function has been quantified for a given camera, the distance to any object of known dimensions, i.e., a reference standard object, can be determined in images acquired with that camera or camera type. First, the reference standard object, located at an unknown distance from the camera, is photographed. Subsequently, using the image analysis tools previously described herein, the size of the reference object in the image is determined. The actual dimensions of the object are input by the user, or in some embodiments, these dimensions are retrieved from a database after identification of the reference object by the user. Using the known size of the object and its size measured in the image, the processing means then calculates Minification value of the object in the image. Lastly, using a Distance Function matched to the camera (or camera type) which was used to capture the image, the observed Minification value may be correlated to a corresponding predicted distance. This gives the user an accurate estimate of the object's distance from the camera at the time the image was captured.

For some optical systems, the degree of minification observed with increasing distance from the camera may change in a non-linear manner. However, for many optical systems, the degree of change in Minification with increasing distance is constant over a wide range, for example from 1-50 feet from the camera, i.e. the Distance Function is defined by a line of constant slope over this range. An example of a Distance Function with a constant slope is depicted in FIG. 8 and another is described in Example 2. In such cases, the predicted Minification of objects imaged at a given distance may be expressed as follows in Equation 9:

$$\text{Minification} = \frac{\Delta \text{Minification}}{\Delta \text{Distance}} \times \text{Distance} \qquad \text{Equation 9}$$

This equation may be rearranged when solving for the predicted distance at a measured value of Minification, as follows in Equation 10:

$$\text{Distance} = \text{Observed Minification} \div \frac{\Delta \text{Minification}}{\Delta \text{Distance}} \qquad \text{Equation 10}$$

A working example of utilizing these functions is described in Example 2.

Distance Functions for a specific device can be empirically derived by the user, as described above. Alternatively, Distance Functions can be determined for a given camera type. Mass-produced optics for digital cameras, for example, digital camera modules embedded in smartphones, are generally substantially identical in performance, and thus the distance functions calculated for an individual camera will be generally be accurate for other cameras of the same model.

Accurate distance measurement using a distance factor requires that the user employ a device having substantially the same optical properties as the device(s) used to generate the Distance Function. Fixed-focus systems with constant focal length are especially amenable to the distance measurement methods of the invention. Newer smartphones employ advanced optical features such as dynamic autofocus, digital and optical zoom, and auto-macro. While these features are advantageous for acquiring high quality images, in some cases they may change the optical properties of the lens system to the point that they significantly alter the degree of minification between different photographs. For example, in two photographs of an object, taken at identical distances from the camera, the object may be differentially de-magnified in the two photographs due to dynamic lens systems' changing optical properties. When acquiring images for distance measurement, it will be advantageous to employ software which locks the optical properties of the device such that they match those of a specific Distance Function. Alternatively, for devices with dynamic lens systems, software could be employed to record the specific optical properties of the system (e.g., focal length) at the time the image was acquired, and then the software could select the most relevant distance function from a matrix or database of different Distance Functions derived across a range of optical properties.

The invention encompasses various configurations of hardware and software for the practice of the distance measurement methods described above. For example, images can be acquired at one site and then transmitted to another site for image analysis (e.g. delineation of the reference standard in the image) and distance calculation. In some embodiments, it is preferred that the image acquisition, image analysis, and distance calculation steps of the invention all be performed on a single mobile device, e.g. a smartphone, and that the smartphone's on-board camera be used as the image acquisition device. In other embodiments, the invention comprises external camera modules that are interfaced with a device, i.e. smartphone or computer, on which the image analysis and distance calculation steps are performed. The use of external camera modules may be advantageous in certain situations. For example, the optics on such modules are not constrained by size, as are the on-board camera modules found on smartphones, and may be of higher quality and/or may include a flash unit for imaging under any light conditions. Such external modules may also have optics which are optimized for imaging outside the range of normal camera modules found in mobile devices, for example the external unit may comprise lenses adapted for microscopic, close-up (e.g. macro lens), or distance photography (e.g. telephoto lens). Additionally, the optical properties of the optics in external modules will be known and constant, regardless of which devices are used in the subsequent image analysis and distance calculation steps. This avoids the need to derive separate Distance Functions for different models of smartphone.

The invention further encompasses distance calculation computer programs which can be downloaded to a smartphone. A database of Distance Functions for common smartphone camera modules can be constructed empirically by determining the Distance Functions for each model as set forth above. The computer program of the invention will either contain this database or be capable of retrieving it from a remote memory site, allowing the user, by dropdown menu for example, to select the correct Distance Function for the particular type of smartphone being used.

Reference standard objects used in distance measurement can be any item of known size. Preferred reference standard objects will be of adequate size such that varying the distance of the object from the camera yields measurable differences in minification within the user's desired range of error. If the reference object is too small, i.e. too far away from the camera to be accurately resolved, the precision of the distance measurement will be reduced. For example, a preferred reference standard will be of such size that its relevant axis of measurement pictured in the image is in the range of at least 5% to 90% of the width or height of the acquired image. As in previous embodiments, if the reference standard object is a non-standard item, the user can manually input the size of the object. Alternatively, if the item is a common item of standardized dimensions, the user can select, for example by drop-down menu, the identity of the object and the program will retrieve the object's known dimensions from a database containing the size attributes of common objects.

Exemplary distance measurement applications include the measurement of land parcels, buildings, rooms, research areas (i.e. transects), and other distances in any number of contexts, including architectural, urban planning, military, real estate, surveying, construction, law enforcement, and research. The distance measurement applications described herein may also be used for mapping and surveying, in conjunction with other technologies such as GPS and radio frequency tracking devices.

Velocity Measurements.

The distance measurement methods described above can be employed to measure the velocity of a moving object. For example, two images of an object of known dimensions, travelling on a substantially linear path towards or away from a stationary camera, can be captured at a known time interval. The distance measurement methods described above can then be utilized to determine the object's distance from the camera at each of the two time points which define the time interval. Subsequently, the change in distance from the camera divided by the length of the time interval will yield the object's average velocity.

In some embodiments, the reference standard object is the moving object of interest. For example, when measuring the velocity of a person walking, if the person's height is known, the person becomes the reference standard object for calculation of distance from the camera in each image. Alternatively, a reference standard object of known dimensions may be affixed to a moving object. For example, a sticker of known dimensions may be affixed to a walking person or moving vehicle to serve as the reference standard object. In other embodiments, the reference standard object is stationary, and velocity is calculated by acquiring serial images of the stationary reference standard object by the camera as it is in motion, travelling in a substantially linear path towards or away from the stationary reference standard object.

The velocity measurement methods of the invention may be implemented in various ways. In some embodiments, two still images of the moving reference standard object are acquired by the device, and the time interval between the acquisition of the images is measured, or calculated from time-stamp data recorded as each image is captured. Image analysis and distance measurement functions are then carried out, as described above, to determine the object's distance from the camera in each image. Using the change in distance of the object from the camera between the two images and the time elapsed between the acquisition of the two images, the object's velocity is calculated. Alternatively, a video of the moving reference standard object may be captured. Time-stamped still frames from the video may then be extracted, and the change in distance from the camera divided by the time elapsed between the two frames will yield the reference standard object's velocity. The use of multiple images from a video allows for a richer analysis of the object's motion, enabling the calculation of the object's acceleration, deceleration, speed profile, and other parameters in addition to average speed. In another embodiment, a video of the object moving towards or away from the camera is captured.

For example, the speed of a person walking in a substantially straight path towards or away from a camera can be estimated. This parameter, called gait speed in medical contexts, is of great clinical significance. For example, gait speed is highly predictive of life expectancy in elderly populations, and is also used as a prognostic measure, for example to assess prostate surgery outcomes and recovery rates. So long as the walking person's height (accounting for footwear) is known and that the person remains in substantially the same posture, their height will remain essentially constant and their velocity can be readily measured by capturing, at a known time interval, at least two images of the person moving in a straight path towards or away from the camera. For example, the image acquisition and timing steps could be performed by a patient equipped with a software-enabled smartphone and the resulting images could be transmitted to a doctor, medically trained personnel, or researcher or for analysis. This would allow patients and research subjects to produce high quality gait speed data in the convenience of their home, obviating the need for a visit to or from medical personnel. The transmission of the video to a trained professional also allows for more consistent, higher quality analysis. Additionally, the trained professional may observe secondary features of the subject's gait, such as a limp or an asymmetric step pattern. The transmitted video may be displayed in a preview field showing individual frames from the video, allowing the researcher or medical professional to select specific frames for analysis.

Additionally, the speed of a moving person could have utility in athletic contexts. For example, a runner heading towards an object of known dimensions could capture images at timed intervals, allowing calculation of the runner's speed.

Height Measurements.

In some cases, it will be desired to measure the height of tall objects, for example buildings and trees. Disclosed herein are methods for the measurement of such tall objects, using the distance measurement methods described previously, combined with inclinometer measurements. Height measurement may be carried out using a mobile device equipped with a camera and inclinometer. The basic methodology is illustrated in FIG. 9. The user (914) is trying to determine the height of a tall object, in this example a tree (901). First, utilizing a mobile device (902) oriented substantially vertically (i.e. with the optical axis of the camera oriented substantially horizontally), the user takes a photograph of a reference standard object of known size (903), for example a person of known height, such reference standard object located at substantially the same distance from the camera as the tall object (for example, a person standing next to or just in front of the tree). Using the distance measurement methods described previously, this image may be analyzed to determine D, the distance between the camera and the tall object (904). Holding the camera in substantially the same spatial location, and angling it upwards, the user then lines up the camera's field-of-view on the top of the tall object (906), for example with the aid of a cross-hairs or other aiming guide superimposed on the camera preview field-of-view. An inclinometer is then engaged and a measurement of the angle between the horizontal axis of the camera and the top of the tall object ($\alpha T$)(907) is recorded.

Using D and αT, the height difference between the camera and the top of the object (H1) (908) can be calculated using basic trigonometric functions, for example using Equation 8, as follows.

$$H1 = \mathrm{Tan}(\alpha T) \times D \qquad \text{Equation 11.}$$

Similarly, again holding the camera in substantially the same spatial location, and angling it downwards, the user then lines up the camera's field-of-view on the bottom of the tall object (910). An inclinometer is then engaged and a measurement of the angle between the horizontal axis of the camera and the bottom of the tall object (αB) (911) is recorded. Using αB and D, the camera's height off the ground (H2) (912), is then calculated using trigonometric functions, for example as in Equation 9 as follows.

$$H2 = \mathrm{Tan}(\alpha B) \times D \qquad \text{Equation 12.}$$

H1 and H2 may then be added to determine the total height of the tall object (913). It is appreciated that this basic method can be carried out in various configurations, including by use of a smartphone equipped with a camera and inclinometer and wherein the appropriate software for carrying out the distance and trigonometric calculations of the method is either located on board the mobile device, or is located on another device to which the image, reference standard actual size, and inclinometer readings are transmitted for analysis. In those height measurement embodiments of the invention which are directed to very large scale objects, the software may include correction factors that account for the curvature of the earth.

Biometric Measurements.

The methods of the invention may be used for biometric applications, including medical, security, research and other applications where the dimension of various body parts is desired. Exemplary measurements include skin color, waist size, shoulder width, height, distance between hips, distance between wrist and the ground, distance between eyes, and any other measure desired. Measurements can include series of measurements (e.g. measurements of relationships between facial landmarks) that, together, constitute a unique identifier with can belong to only a single individual. Potential uses for such biometric measurements include person identification, security screening to detect subjects who may be disguised, diagnosis of disease or conditions, population studies, and even novelty uses.

In one embodiment of the invention biometric measurements of one individual who appears within the same image of the target subject can serve as a reference standard for measurements upon the target subject, who lies the exact same distance from the camera at time of image capture. This is especially useful in certain contexts, such as national or airport security, where it is desirable that the target subject not be aware either that he/she is being photographed, or, that he/she is being photographed for the purpose of biometric measurement data collection. For example, if a suspected criminal (target subject) is being followed within an airport, but no biometric data has been previously collected for this target, a confederate of the photographer, for whom many biometric measurements have already been performed (or, could be performed in the future, since this individual is a confederate of the photographer), stands next to the target subject, without arousing suspicion in the target subject. A photograph is then taken, with care to ensure that both the confederate (serving as the reference standard) and the target subject, are located the same distance from the camera. In this way, a virtually unlimited number of biometric measurements can be made of the target subject, both post-hoc, and without his/her being aware that these detailed, highly precise measurements are being made. Even calibration can be performed post hoc, such that a single measurement of the person or object used as the reference standard yields image size data that allows unlimited biometric measurements of the target subject.

Spherical Reference Standard Objects.

In circumstances where the area to be measured is significantly larger than the reference standard object (and hence not subject to angle distortion), if the latter is flat and oriented even slightly askew to the camera—such that the reference standard object appears smaller than it actually is, then a substantial systematic error can result when the foreshortened measurements of the reference standard object are extrapolated to the large measurement field. In such cases, it may be useful to use a spherical reference standard object, because the diameter of a sphere is the same, regardless of the angle of view. In one embodiment, spheres of known diameter are provided as reference standard object for measurement. In another embodiment, the sphere is affixed to a sticker (which is itself affixed to the target being measured), or is suspended over the target.

Microscopes, Endoscopes, and Other Scientific and Medical Instruments.

The image acquisition means of the invention may be any image-capturing device, including cameras which can image the field of view of a microscope, endoscopes for imaging inside the human body, borescopes for engineering uses, fiber-optic or other types of miniature cameras, etc. Reference standards can include any objects of known dimension which are placed on, next to, or otherwise in-frame with the camera's field-of-view. For example, in the case of microscopic objects, microspheres, microbeads, and other microscopic objects of known and consistent dimension may be used. Spherical items are especially useful in microscopic measurement applications because their diameter remains essentially constant at all orientations. Small items connected to an X-Y micro-positioning system may also be employed, with the objects being manipulated such that they are placed in the proper positioning to act as an effective reference standard.

In the case of microscopy, the measurement of living cells can be achieved by placing microbeads, microspheres or other microscopic reference standard objects reference standard objects into the cell culture environment. In the case of static cells, for example, microscopic reference standard objects may be incorporated onto or within the culture planar growth media substrates where cells are being cultured. The invention further encompasses serial measurements of cells at various time intervals to assess morphological changes, for example growth rates. Imaging for growth analysis may be complemented with parallel measurement of other cell properties, for example as assessed by immunoassays, spectral imaging, and impedance spectroscopy. Alternatively, cells in solution can be measured by imaging them as they are moved past, next to, or otherwise in proximity to fixed reference standard objects using various means, such as solution flow systems, micromanipulation systems, dielectrophoretic systems, optoelectronic tweezer systems, and other cell manipulation systems known in the art.

When using fiber optic cameras such as endoscopes, laparoscopic instruments, borescopes, and the like, a reference object may be attached to the image acquisition means at a fixed distance from the lens. For example, a small rod with a reference object of known size attached to the end, for example a sphere, or an L-shaped bend (analogous to a hockey stick,) could be mounted on the end of fiber optic, endoscopic, or borescopic cameras, with the reference object positioned a known distance from the lens, for example at the focal point of the lens for best focus. The reference object could then be positioned against the surface of the item of interest and images acquired for subsequent analysis.

Figure 2A:
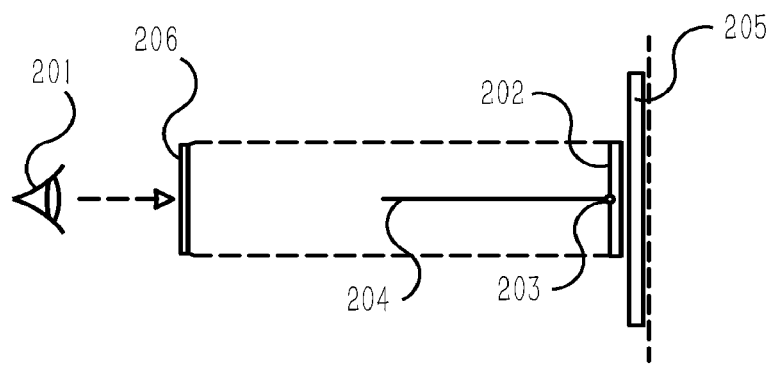
In FIG. 2A, the dynamic reference standard is pushed against an object (205) that is substantially flat, and the bar of the dynamic reference standard (202) is not deflected, i.e. to an observer or camera (201), the bar appears in its maximum size (206).
Figure 2B:
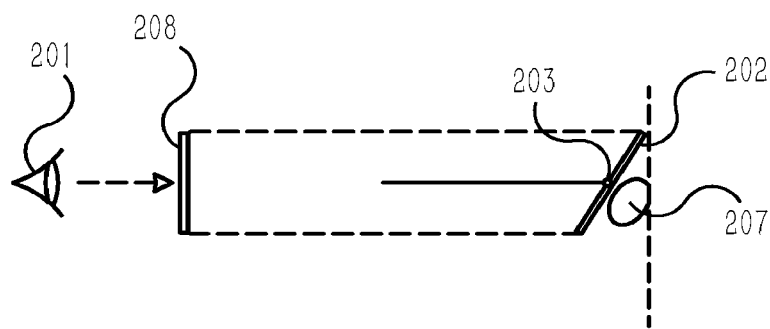
In FIG. 2B, the dynamic reference standard is pressed against an object having some depth (207), resulting in the bar (202) pivoting around the pivot means (203). The reference standard bar appears smaller (208) to an observer or camera (201) because it is not in-plane with the image and is foreshortened.
Figure 2C:
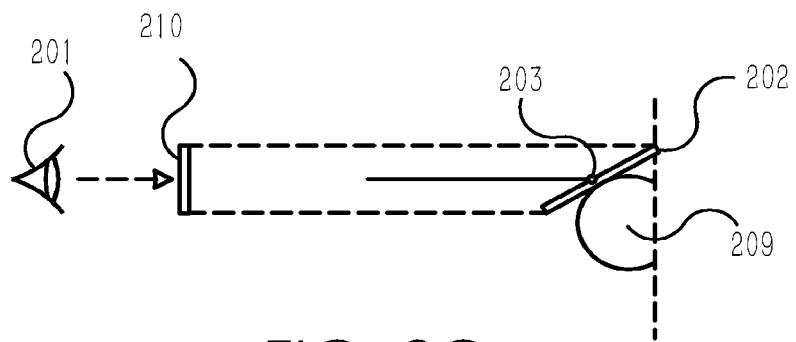
In FIG. 2C, the dynamic reference standard is pressed against a larger object (209) and is deflected such that its apparent size (210) is even smaller to an observer or camera (201).

In many situations, for example medical applications, the item to be measured is not flat. For example, cells, tumors, and other biological objects of interest, both in vivo and in vitro, may be anywhere from planar to spherical in shape. In such cases, it would be advantageous to have information about the three-dimensional shape of the object to aid in interpreting the two dimensional images taken by a fiber optic camera. Three-dimensional aspects of an object can be assessed using a dynamic reference object. The dynamic reference object, when in the default position, is angled parallel to the lens of the image acquisition device. The dynamic reference object is capable of moving, e.g. swiveling or pivoting, when in contact with an object that is not flat. The reference object's size in the resulting image will change as a function of the angle to which it has been deflected from parallel. This will allow the user to estimate the depth of an object into the plane of the image. FIG. 2 depicts an exemplary dynamic reference standard. At the distal end of a rod attached to the image acquisition means, one or more arms protrude at right angles and are capable of pivoting towards or away from the camera lens (the distal end of the rod comprising the pivot point). In the default position, the arms will be parallel to the lens and will have a maximal image length. When pressed against a three dimensional object, the arms will be deflected from parallel to the lens and will appear foreshortened in subsequent images. The degree of foreshortening is proportional to the angle of deflection from parallel, and can then be used to determine the three dimensional aspects of the object.

Social Media Applications.

The invention further encompasses methods and systems wherein acquired images and size measurements interact in various ways with databases, libraries, file-sharing systems, and social media websites. Images and measurements could also be uploaded to databases and made accessible to others via websites or apps. For example, researchers working in the same field could share data. The methods of the invention also lend themselves to various novelty uses, for example, contests and competitions could be enabled by the measurement applications described herein interfacing with databases and websites and/or apps. The measurement methods, interfacing with social media websites or interactive apps, provides a means for people with shared interests to documents, share, and show off various measurements. For example, sportsmen could upload images and measurements of fish or game they have caught, farmers could compare crops and livestock, and extreme sports participants could document the height and distance of their jumps. Shared images may be posted on websites or social media platforms, and posted images could include delineation graphics overlaid on reference standard and target objects, as well as calculated measurement output in order to demonstrate to others the accuracy of the user's measurements. An image-base measurement app could also act as an independent social media platform, serving as a conduit to connect people with like interests. Such configurations of the measurement software, in addition to measurement functions, could include features such as a public gallery for posting measurement images, user profile pages, messaging between users, and other features standard to social media platforms.

Secondary Estimates Based on Measurement Data.

The invention further encompasses estimates of secondary properties based on the primary measurements made using the methods and systems disclosed herein. In any case where the two-dimensional aspects of an object (e.g. length, area) have been measured using the previously described methods, secondary properties which are highly correlated to the two-dimensional measurement may be calculated. For example, if the diameter of a substantially spherical object is measured, then its volume can also be estimated using the known relationship between a sphere's diameter and volume. Further, if the volume of the object is estimated, then its weight can also be estimated, based on the known average density of like objects. In this way, the primary measurements performed by the invention can be extended to allow accurate estimates of many useful parameters. Estimates of secondary properties can be made by accessing databases with equations that relate the primary measurement to secondary characteristics and then performing the desired calculations. Such databases and calculation steps can be stored and/or performed on board the same device or devices used to perform the measurement, or can be accessed and/or performed remotely.

For example, in biology, allometry is the study of relationships between an organism's shape and related characteristics. Allometric relationships are well defined for a number of organisms, allowing the measurement of one part of an organism to enable accurate estimates of other parameters. For example, body length and weight are highly correlated in many fish species, and a tree's diameter at chest height is indicative of the tree's total biomass. Using allometric relationships and those embodiments of the invention configured for mobile devices, the invention can be used to conveniently assess important biological parameters in the field. In the medical context, certain body measurements, for example, hip width or bust size, are known to be proportional to total body weight, and these parameters, measured using the methods of the invention, can be used to estimate current weight or, using serial measurements, can be used to monitor trends in weight gain or loss.

Another example of secondary estimation is calorie counting. In one embodiment, the user can discreetly portion different types of food on a plate and use the measurement tools provided herein to determine the portion size of each food type. For example, the user could be instructed to arrange the food in a pile of set height (e.g. one inch high, or one fork's width high) and then photograph it from above. The software programs of the invention would then perform an area measurement on the food pile and then, using the known height of the pile, could perform a facile calculation of the volume of the food in the image. Alternatively, the food could be imaged from different angles to yield volume information. The user may then input the food type, and a processing means will then access a database to find the density of like foods (for example, the average weight of one cubic inch of French fries), allowing calculation of the weight of the imaged portion. Accessing a database of caloric and nutrition per unit weight values for that type of food (for example, the average number of calories and the fat content per gram of French fries), the processing means can subsequently calculate caloric and other nutrition information for that portion. Prior art software programs have been developed to identify food composition using image analysis tools (for example, mobile device apps such as MealSnap™ and Calorie Counting Magic™). These prior art tools can identify food items in an image and provide the user with general calorie and nutrition information about the food on a per unit weight basis. However, the prior art programs do not estimate the weight of the portions being imaged. The measurement software programs of the present invention may be advantageously combined with the prior art software tools, or machine-vision pattern and color recognitions tools, to both identify the type of food in an image, and to accurately determine the size of the imaged portion and its caloric and nutrition content.

Using a simple area measurement of the food may be sufficient to provide an approximate estimate of portion size (and associated nutritional values). Databases may be constructed empirically for various food types by taking multiple measurements of each food type to determine the average portion area vs. portion weight for that food type. For example the average weight of one square inch of salmon fillet or the average weight of one square centimeter of mashed potatoes could be determined. The user could be instructed to place a reference standard on the plate and acquire a single top view of the plate. The area of each food type could then be calculated and correlated to the average values derived as described above to yield an estimated portion weight. As described above, this portion weight could be translated into calorie, sodium, fat, and other nutritional parameters of the portion based on the known nutrition content of like foods. This method lacks the accuracy of a more precise volume measurement, but allows simple, single-image portion analysis.

Fitting Aid.

On-line shopping is convenient in many ways, but the disadvantage of this retail system is that users cannot try on clothes or other accessories before purchase. A 2005 survey found that for most on-line retailers, the cost of processing a merchandise return was between $6 and $15 dollars (Internet Retailer, Sep. 1, 2005 at http://www.internetretailer.com/2005/09/01/online-retailers-learn-to-live-with-that-persistent-problem-of-r). Therefore, it would be advantageous to reduce the frequency of merchandise returns by improving the shopper's ability to choose the right sized merchandise before purchase. The methods of the invention advantageously allow facile measurement of various body proportions such as neck width, hip width, foot length and width, inseam length, etc. The user simply acquires images of relevant body parts while holding reference standard objects against themselves. Subsequent measurements can then be made by delineating the reference standard and the endpoints of the body parameter of interest, using the systems, methods, and computer programs described herein. These measurements can be made by the user, or by a trained employee of the retailer viewing photographs transmitted by the user. The user's body measurements can also be employed to estimate secondary measurements, e.g. neck circumference from neck width, waist circumference from hip width, etc. Using the primary or secondary measurements, the user can be directed to the proper size clothing, shoes, accessory, or equipment best matched to the user's proportions.

The sizing methods of the invention could also be employed in the medical context, where the proper sizing of braces, canes, walkers, and other orthopedic or medical accessories is required. For example, the patient could be instructed to have photographs taken of themselves holding various reference standard objects against their bodies, or holding reference standard objects while in specific poses. These images could then be transmitted to a trained professional in a remote location who could then accurately assess parameters such as hip-to-floor distance, wrist-to-floor distance and other relevant measures. The properly sized medical equipment could then be delivered to the patient, obviating the need for a visit to or from medical professionals. The methods of the invention could then be further employed to assess the fit of the delivered medical supplies.

Municipal Parking Enforcement.

In urban areas, vehicles are frequently cited for parking violations such as encroachment of "red zones," parking too far from the curb, and other infractions based on the position of the vehicle relative to other objects. The methods of the invention allow for accurate assessment and documentation of vehicle position. This would aid in the objective enforcement or parking rules, and conversely would provide cited persons an objective grounds for contesting improper citations. Enforcement personnel could acquire images of the vehicle with reference standards placed on the ground in order to generate highly accurate measurements. Time and date data could be collected simultaneously with image acquisition, in the event that temporal factors are relevant in determining the infraction. Compact systems embodying these methods could be incorporated into standard mobile ticketing computers used in the field by enforcement personnel. Reference standards attached to or printed onto the shoes of enforcement personnel could be employed, allowing the user to simply stand in the contested space and shoot a photograph of the ground with the footwear visible, obviating the need for a separate reference standard object to be placed in the image and subsequently recovered.

Screen Ruler Tool.

The aforementioned embodiments employ the use of image analysis to make measurements. In an alternative embodiment, the size of objects can be measured without the acquisition of an image. In these methods, the object is placed directly on a horizontally oriented touchscreen, for example as found on a smartphone or tablet computer. The endpoints of the object are then delineated, for example by use of a caliper tool, as described above. Alternatively, the borders of the object can be delineated, for example by tracing with a stylus or finger around the object. The delineated endpoints or borders can then be mapped to the actual dimensions of the screen using standard processing tools known in the art, yielding length or area measurements of the object. If calibration is necessary, a reference standard object of known dimensions can be placed on the screen, delineated, and its known size input or accessed from a database.

Live Video.

In general, the methods of the invention described herein have been directed to the analysis of images that have been captured and stored as image files. However, it will be understood by one of skill in the art that the methods and systems of the invention may be applied to live video streams. In such embodiments, the image analysis step may be carried out by means of a graphical user interface which measures the image size of delineated items on the display means itself, rather than measuring their size in a stored image file. For example, a caliper icon superimposed on a video monitor could be used to delineate an object and the object's image size would correspond directly to its displayed size on the video monitor screen.

Hand Controller Interfaces.

In some situations, a user will be manipulating a device using a hand controller such as a wired glove, a joystick, a trackerball, or other apparatus interfaced to the movements of the user's hand. For example, hand controllers may be used to manipulate the placement or action of medical imaging cameras, robotic surgery tools, microfabrication and nanofabrication machines, cellular microgrippers, and other devices. The user typically observes the placement and action of these devices on a live video feed from an imaging system (e.g. fiber optic camera) attached to the device (or, if the device is a camera, from the device itself).

The methods of the invention may advantageously be incorporated into such hand controller systems. This allows the user to conduct fast, real-time measurements of objects in the device's vicinity using the same controller as the device. In this way, the measurement function is seamlessly integrated into the functionality of the device and measurements can be made without interrupting workflow. In such embodiments, the device is configured such that a reference object of some kind can be positioned against features of interest. In some cases, special attachments of known size that protrude from the device can be used. In other cases, portions of the devices themselves, being of known dimensions, may be used. When the user wishes to measure something within the field-of-view of their imaging system, the user positions the reference standard object in the vicinity of the feature of interest. Next, the user toggles their hand controller to a "measurement mode," using any sort of switching device (for example a foot pedal, voice command, or finger motion). In measurement mode, a caliper icon is superimposed over the video display, and the hand controller is interfaced to the caliper icon such that the user can move and size it to delineate the reference standard object and the feature of interest. Lastly, the image analysis step of the invention is performed and the size of the feature of interest is calculated, displayed, and stored if desired.

For example, robotic surgical systems, such as the da Vinci Surgical System™ (Intuitive Systems), employ a fiber optic imaging system attached to miniature instruments which are introduced into the body of the patient. Watching the images acquired by the camera on a video monitor, the surgeon controls the miniature surgical instruments by means of a controller attached to the surgeon's hand and wrist. The surgeon may toggle the controller between various instruments by use of a foot pedal or other switching means. Such robotic systems could be modified to include reference standard objects attached to the imaging/surgical instrument apparatus and software allowing the surgeon to make measurements in real time. For example, an L-shaped probe of known dimensions could protrude or be deployed from a cannula attached to the apparatus and could be moved into position in-plane against a feature of interest in the body. Alternatively, the tip of any of the surgical instruments, being of known size, could serve as the reference standard. The surgeon could then toggle to measurement mode, at which point a caliper icon would be superimposed on the screen of the video monitor and would be interfaced with the hand-mounted controller of the robotic system such that it could be moved and sized by means of the surgeon's finger and hand motions. Upon delineation of the reference standard object and the feature of interest, the size of the feature could be calculated and displayed on the video monitor.

Customization and Business Methods.

The invention further comprises business methods of using the measurement tools of the invention. The different applications of the invention will be useful within various different commercial contexts. The basic software applications and methods of the invention may be customized for uses within a specific market segment. The invention comprises a business method of distributing a software application which enables a smartphone to measure certain objects. The business methods of the invention further comprise configuring distributed software applications or apps to dynamically interface with a central site. From this central site, data content may be continuously or periodically transmitted to the user's device, allowing information or advertising materials to be delivered to the user, for example, such as banner ads displayed on the screen when the app is in use. Additionally, user behavior may be recorded by the app, such as the amount and frequency of measurement, and these data transmitted to the central site for monitoring of individual users or aggregate profiling of user behaviors. Image-based measurement apps could be distributed under any number of free or paid distribution schemes, for example, the user may be required to subscribe or pay for a set number of measurements performed by the app, or certain functions and features (for example, the range of objects that might be used as reference standards, statistical ranking of measurements, the ability to post images to others, etc.) may be limited to users that have paid fees for such functionalities and features.

EXAMPLES

Example 1

The following example, depicted in FIG. 4, is intended to illustrate the basic image acquisition and image analysis processes of the invention. In this example, the target object is a pen, the length of which is desired to be measured. The image acquisition and image analysis steps are carried out simultaneously on a smartphone, and a series of simulated screen shots from the smartphone's display screen are presented in FIG. 4. FIG. 4A depicts a screen shot (401) during the image acquisition step. The user has placed the pen of unknown length (403) on a flat surface, and on the same surface has placed a United States quarter dollar coin (402). Photographing the objects from above, while they lie on a flat surface, the user is instructed to hold the smartphone substantially horizontally (i.e. with the optical axis parallel to the axis of gravity), and orientation may be aided by displayed inclinometer data (405). When the user has the smartphone oriented properly, the user instructs the device to take a picture, for example by depressing a display button (404) to fire the camera.

Figure 4C:
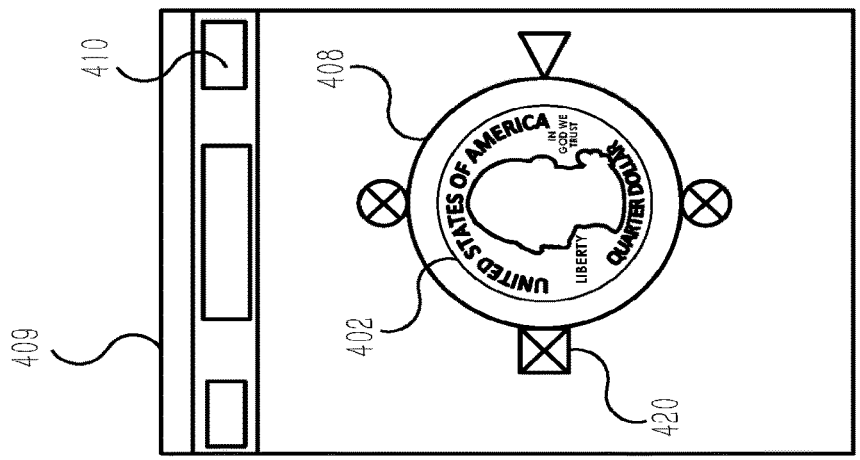
FIG. 4. This figure depicts a series of simulated screen shots which encompass the delineation steps wherein the reference standard object and the target object are delineated in the image so that their image sizes may be measured, as set forth in detail in Example 1.
Figure 4B:
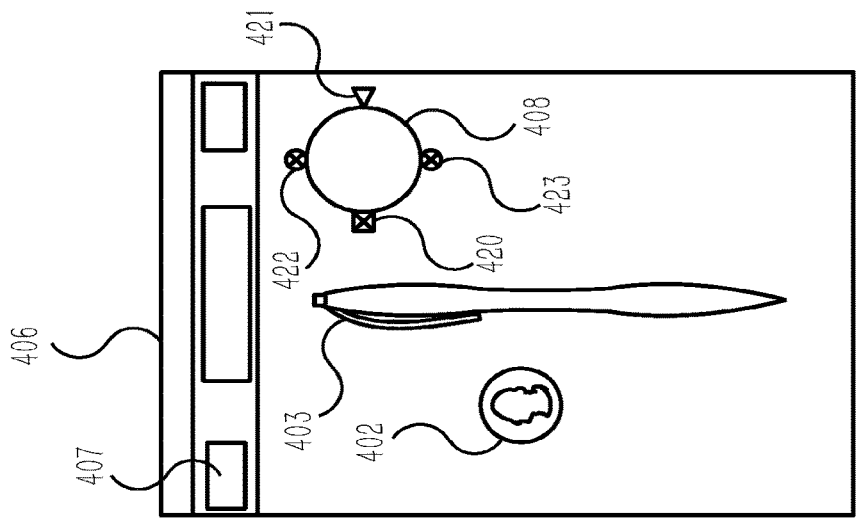
Figure 4A:
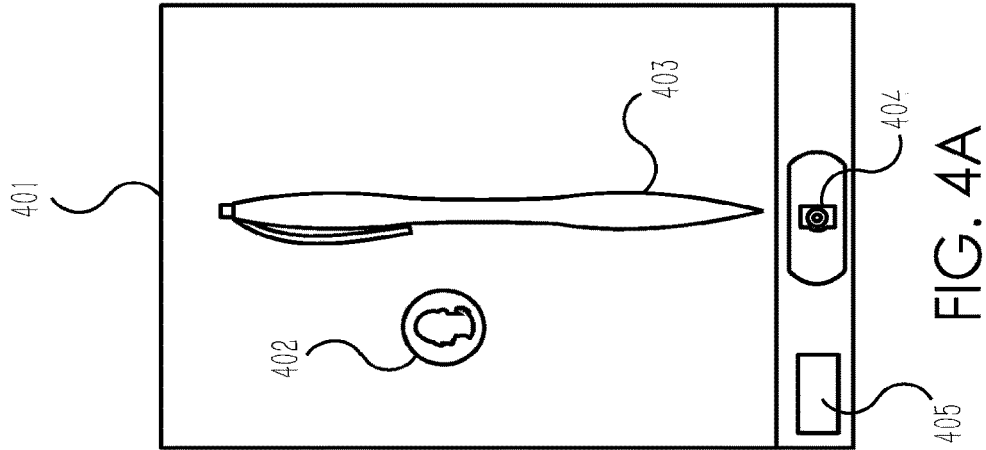

FIG. 4B depicts a screen shot (406) of the acquired image. To delineate the reference standard object, the user pushes a screen button (407) which results in the display of a drop-down menu (not shown) of various objects that may serve as the reference standard. The user selects "United States Quarter Dollar Coin" from the menu. Subsequently, a memory file or database is accessed by the processor means and the identity, shape, and dimensions of the corresponding delineation icon are retrieved (in this case, a circular icon). Also retrieved are the dimensions of the selected object (in this case, the known diameter of a United States Quarter dollar coin, 24.26 mm) and this data is stored for subsequent calculation of minification. A circular delineation graphic icon (408) is then displayed, overlaid upon the image. The delineation icon has at least one movement handle (420) that can be selected and upon such selection, the entire icon can be dragged to different regions of the screen. The delineation icon also includes at least one rotation handle (421) that can be selected, and upon such selection, the entire icon may be rotated by any desired amount. The delineation icon further comprises at least one sizing handle (in FIG. 4B there are two sizing handles, 422 and 423), that when selected, allow the user to shrink or expand the icon to any size.

FIG. 4C depicts a screen shot (409) of the reference standard delineation step. The user has zoomed in on the coin (402) in order to make a more precise delineation. The delineation icon (408) has been dragged such that it is over the quarter, but is not yet properly sized.

Figure 4F:
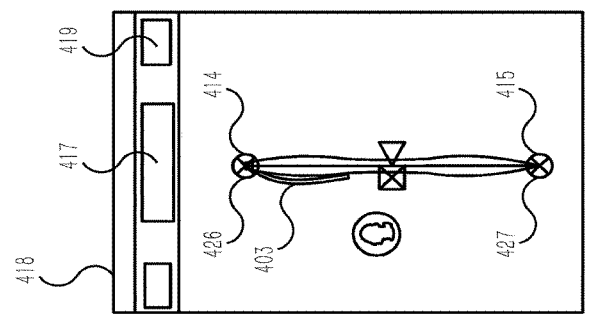
Figure 4E:
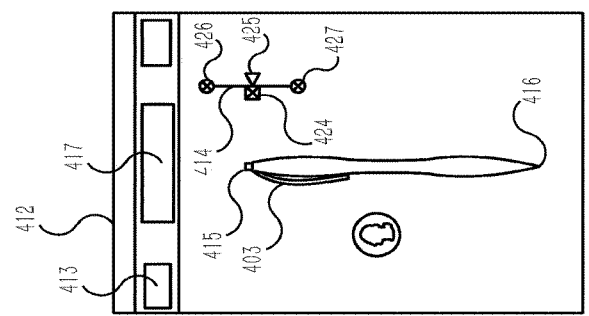
Figure 4D:
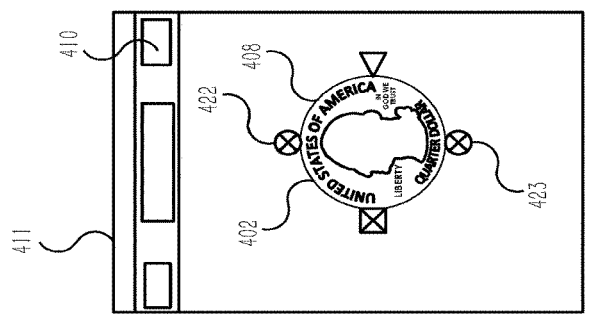

FIG. 4D depicts a screen shot (411) of the reference standard delineation step. Utilizing the sizing handles (422 and 423), the user has now resized the delineation icon (408) such that it perfectly aligns with the borders of the coin (402). Upon such delineation, the user presses a screen button (410) to initiate calibration (i.e. calculation of the minification of the reference standard object). Calibration is performed by first measuring the image region corresponding to the diameter of the circular region delineated by delineation icon, which corresponds to the diameter of the coin in the image. In this example, the image diameter of the coin is measured as 242.6 pixels. The actual diameter of the coin, previously retrieved when the user selected the identity of the reference standard object, is divided by the measured image diameter of the coin to determine the degree of minification of the reference standard object. In this example, the degree of minification is 0.1 mm actual size per pixel.

Next, the image size of the target object pen is measured by delineating the long axis of the pen. FIG. 4E depicts a screen shot (412). The user presses a screen button (413) which results in the display of a dropdown menu (not shown) which lists various types of delineation icons (e.g. linear, circular, square shaped, etc.). In this example, the user selects a linear delineation icon from the menu. Subsequently, a linear delineation icon is displayed (414), overlaid upon the image. The delineation icon has at least one movement handle (424) that can be selected and upon such selection, the entire icon can be dragged to different regions of the screen. The delineation icon also includes at least one rotation handle (425) that can be selected, and upon such selection, the entire icon may be rotated by any desired amount. The linear delineation icon further comprises two endpoint handles (426 and 427) that may be moved in opposing directions to define a line segment.

FIG. 4F depicts a screen shot (418) in which the linear delineation icon has been positioned over the pen (403) and the two endpoints of the linear delineation icon (426 and 427) have been positioned over the precise endpoints (415 and 416) of the pen pictured in the image. The length of the line segment defined by the two endpoints, corresponding to the image size of the line segment they delineate, is then measured using pixel measurement tools. In this example, the line segment defining the long axis of the pen is measured as 1270 mm. The processor means multiplies this measured image size of the pen by the known degree of minification in the image (0.1), resulting in a calculated actual length of 127 mm. This calculated length is displayed for the user on the screen in a display box (41).

Example 2

In this example, the distance measurement methods of the invention are demonstrated using images acquired on a common mobile device. A straight line 45 feet in length was defined on the floor. The line was marked at 5-foot (60 inch) increments. Person A, standing 71.75 inches tall, was photographed by another person who was standing in a fixed position, using the on-board camera of an iPhone™ 4 (Apple), the optical axis of which was aligned with the line on the floor (i.e., the person taking the pictures was holding the smartphone in a vertical orientation and was aiming the camera straight along the line). Person A was photographed at each of the 5-foot increments marked on the line. Subsequently, the images acquired on the smartphone were transferred to a laptop computer, where the image height of Person A in each image was measured using Photoshop™ 5 (Adobe). Person A's image height (in pixels) and their position along the line (location 0 being the closest to the photographer) is presented in Table 1.

TABLE 1

| Distance of Person A Along the Line (inches) | Person A's Image Height (pixels) | Minification of Person A (inches actual height/pixels) |
|---|---|---|
| 0 | 704 | 0.101918 |
| 60 | 510 | 0.140686 |
| 120 | 399 | 0.179825 |
| 180 | 327 | 0.219419 |
| 240 | 278 | 0.258094 |
| 300 | 242 | 0.296488 |
| 360 | 214 | 0.33528 |
| 420 | 192 | 0.373698 |
| 480 | 174 | 0.412356 |
| 540 | 159 | 0.451258 |

The distance from the end of the line to the camera was not recorded, therefore, Person A's absolute distance from the camera cannot be determined in this Example. However, Person A's known image size at various distances along the line may be used to calculate a Distance Function for the smartphone's camera. The degree of minification of Person A in the images (i.e. Person A's image height (in pixels), divided by his actual height (in inches)) was plotted against his distance along the line in each image. Minification was found to change in a constant, linear manner along the length of the line. This distance constant was determined by linear regression of the Minification values against distance (i.e. distance along the line). Linear regression was performed using a standard linear regression equation, yielded a Distance Function constant (the slope of the line) of 1546.59 (inches (actual size) per pixel-inch (distance along line), with an $R^2$ of 0.99988. The high $R^2$ value demonstrates the fidelity and high reproducibility of the relationship between object size and image size over distance.

Subsequently, to test the predictive power of the first set of measurements, Person B, standing 68 inches tall, was filmed walking along the line towards the camera using the video filming function of the smartphone (iPhone™ 4 (Apple)). The video file was transferred to a laptop computer, and still frames of the video depicting Person B at different points along the line were extracted using iMovie™ (Apple). Person B's image height in each extracted image was measured (in pixels) using Photoshop™ (Adobe Systems). Using the Distance Function constant derived above, person B's predicted distance along the line was determined by multiplying his observed degree of minification by the Distance Function constant. Table 2 shows Person B's image height, minification, predicted distance from the camera, and actual distance along the line.

TABLE 2

| Person B's Distance Along Line | Person B's Image Height | Minification of Person B (inches actual height/pixels) | Person B's Predicted Distance from the Camera |
|---|---|---|---|
| 0 | 804 | 0.085 | 130.806 |
| 60 | 553 | 0.123 | 190.177 |
| 120 | 418 | 0.163 | 251.598 |

TABLE 2-continued

| Person B's Distance Along Line | Person B's Image Height | Minification of Person B (inches actual height/pixels) | Person B's Predicted Distance from the Camera |
|---|---|---|---|
| 180 | 337 | 0.202 | 312.072 |
| 240 | 283 | 0.240 | 371.619 |
| 300 | 242 | 0.281 | 434.579 |
| 360 | 215 | 0.316 | 489.154 |
| 420 | 190 | 0.358 | 553.516 |
| 480 | 171 | 0.398 | 615.018 |
| 540 | 156 | 0.436 | 674.155 |

Person B's distance from the camera at the time of image acquisition was not recorded. Therefore, the absolute distance from camera estimates in Table 2 cannot be reliably checked against actual distances. However, Person B's actual change in distance along the line as he walked towards the camera is known, and may be used as a reliable control for testing the reliability of predictions made by the method. Person B's change in distance was assessed at three points; a short distance walked far from the camera, a longer distance walked from far to near the camera, and a short distance walked near the camera. These results are summarized in Table 3.

TABLE 3

| Line Interval Walked By Person B | Actual Change in Distance (inches) | Predicted Change in Distance (inches) | Error (inches) | % Error |
|---|---|---|---|---|
| From 540 to 480 | 60 | 59.371 | 0.629 | 1.048 |
| From 60 to 0 | 60 | 59.136 | 0.864 | 1.439 |
| From 540 to 0 | 540 | 543.348 | 3.348 | 0.620 |

As shown in Table 3, the distance estimates derived using the methods of the invention are very accurate, with an error of just 1.5%. The method appears to be equally adept at measuring both short and long distances, at locations both close and far from the camera.

The result in this example demonstrate the utility of the invention for the measurement of not just distance, but for velocity as well. The accurate results reported above were attained using still frames from a video file. Such still frames are individually time-stamped (for example time stamped to increments of 0.01 second on the iPhone 4) so that the elapsed time between any two still frames may be readily and accurately ascertained. Accordingly, the accurate changes in distance reported above may be readily converted to velocity measurements by dividing the elapsed distance between two still frames by the time elapsed between the frames being taken.

Example 3

A software program embodying several aspects of the invention was developed. The software program, named "MedMeasure" (V2.8) was developed in the iOS programming language as an "app" capable of running on Apple iPhone and iPad devices.

The methods of the invention are practiced by MedMeasure in the following order. First, the user is instructed to select a reference standard from a drop-down menu listing various common objects, including United States coins. Alternatively, the user may define a custom reference standard by selecting this option and inputting the linear dimensions along a particular axis of measurement of the reference standard object. The user may also specify the units to be used, in either English or Metric units of length (e.g. inches or mm). After Step 1 is completed, MedMeasure proceeds to Step 2, where the user is instructed to acquire an image of the target object and the reference standard object while holding the camera in-plane with these objects. The camera is engaged, displaying the camera preview field-of-view for the user. During the image acquisition step, a bull's-eye type bubble level graphic is displayed and displays data from the device's inclinometer, allowing the user to position the camera perfectly horizontally when photographing images lying on a flat surface, by centering a virtual bubble within the bull's-eye guide. If a vertical orientation is preferred, the bubble level displays the smartphone's forward or backward tilt as well as clockwise or counterclockwise rotation. The user is instructed to orient the camera such that the bubble is centered, and then acquire an image. The user acquires an image by pressing a button.

MedMeasure proceeds to Step 3, the image analysis step of the inventions, wherein the user is instructed to delineate the endpoints or borders of the reference standard object using a caliper graphic, resembling an actual caliper, which such graphic is superimposed over the image and may be rotated. Two handles allow the user to position the arms of the caliper at the endpoints to be measured (for example, the diameter of a coin). Once the user has delineated the endpoints of the reference standard object within the arms of the caliper, the user is instructed to press a button labeled "calibrate."

Upon the user's pressing of the calibrate button, the caliper icon graphic changes to a semi-transparent state. MedMeasure calculates the image size of the object by mapping the delineated line segment defined by the caliper arms to the original image file and engaging a pixel ruler tool to measure the length of the line segment in pixels. The reference standard object's dimensions are retrieved from memory (either the known dimensions of the identified reference standard object, or the custom dimensions inputted by the user) and the degree of minification of the reference standard object is calculated. Employing Equation 3, the actual size represented by the line segment delineated by the arms of the caliper is displayed in real time for the user. The caliper icon may now be positioned and sized over the axis of desired measurement of the target object, and the object's linear size is displayed. The user may press a "Save" button, which saves the image, including the displayed caliper and displayed measurement, and also saves measurement data to memory, as well as simultaneously recording time and date of the image.

Saved files are stored in a gallery. Files in the gallery may be opened and displayed in the software application, or they may be shared or distributed, by numerous means. Shared files may be sent via email as an attachment, they may be transmitted to a URL, or they may be posted to Facebook.com or Twitter.com. When sharing or distributing files, the user may select whether the measurement data only or both the measurement data and the image are to be transmitted. If measurement data only is to be shared, it will be sent as an Excel spreadsheet files with the raw numeric measurement (and units) as well as the time and date that the data was acquired. If the image is to be shared as well, it will be sent as a PNG image file.

MedMeasure V2.8 also includes a protractor which can be superimposed on the image, moved, and resized in order to determine angular features of objects in the image.

The measurement of numerous objects has been tested with MedMeasure 2.8 with very high accuracy at both long and short distances. For example, in one set of experiments, a one-inch area on a yardstick and a coin acting as the reference standard object were photographed twenty four times. In each image, the reference standard object and the one inch area were subsequently delineated to yield a calculated length of the inch-long region of the yardstick. The calculated length matched the actual length with 98.9% accuracy.

MedMeasure V2.8 has also been tested in clinical usages for the measurement of penis length and diameter. The resulting measurements made with the system, checked against measurement with actual rulers, demonstrates a very high degree of accuracy, over 99.9% in all cases tested.

All patents, patent applications, and publications cited in this specification are herein incorporated by reference in their entirety. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

The invention claimed is:

1. A method of measuring a dimension of a first object pictured within an image, wherein a second object having one or more known dimensions is also pictured in the image in the vicinity of the first object, comprising the following steps:

the image is displayed for a user on a graphical-user interface;

the user selects the identity of the second object from a menu listing two or more objects;

upon the user's selection of the second object's identity, an actual dimension of the second object is retrieved from a memory file for use in subsequent calculations;

a displayed measurement tool, capable of being moved, resized, and/or rotated is provided;

the measurement tool is positioned and resized by the user over the image of the second object such that the measurement tool's borders or endpoint substantially overlay the borders, or endpoints of an axis, of the second object having a known actual dimension;

the image size of the second object is determined by mapping the endpoints or borders of the measurement tool to the image file and measuring an image size of the second object as delineated by the icon;

a processor means calculates a ratio of actual size to image size by dividing the previously retrieved actual dimension of the second object by the measured image size of the second object;

a second measurement tool is displayed which such measurement tool can be moved, resized, and/or rotated;

the second measurement tool is positioned and sized by the user such that its borders or endpoints substantially overlay the borders, or endpoints of an axis desired to be measured, of the first object; and using the previously calculated ratio of actual size to image size, the actual size of the delineated dimension of the first object is calculated by a processor means.

2. The method of claim 1, wherein
the objects listed in the menu include one or more object selected from a group consisting of a coin, a bank note, a person of known height, a sticker of known dimensions, a printed object of known dimensions, a shape made of projected light, and a pair of points comprising projected light.

3. The method of claim 1, wherein
the first and/or second measurement tool displayed comprises two borders or endpoints defining a straight line segment.

4. The method of claim 1, wherein,
the first and/or second measurement tool displayed comprises shape of fixed proportions, capable of being positioned and resized.

5. The method of claim 4, wherein
the first measurement tool comprises an icon of proportions corresponding to the geometric shape of the second object, the identity of which has been selected from a menu.

6. The method of claim 5, wherein
the selected second object is a circular coin and the first displayed measurement tool is circular.

7. The method of claim 1, wherein
the dimension of the first object being measured is a length measurement.

8. The method of claim 7, wherein
the measured length is the length of an object selected from the group consisting of a rash, a lesion, a wound, a penis, a foot, and a fish.

9. The method of claim 1, wherein
the dimension of the first object being measured is an area measurement.

10. The method of claim 9, wherein
the graphical user interface is a touchscreen; and
the borders of the first object are delineated by tracing the shape of the object with a finger or stylus.

11. The method of claim 9, wherein
the measured area is the area of a rash or a lesion.

12. The method of claim 9, wherein
the measured area is the area of a food portion; and
the method comprises the additional steps of:
allowing the user to specify the estimated height of the food portion;
calculating the volume of the food portion by multiplying the estimated height by the measured area;
allowing the user to specify the identity of the food in the portion; and
calculating the caloric value of the food portion by multiplying its volume times the estimated caloric value per unit volume of like food.

13. The method of claim 1, wherein
some or all of the steps of the process are performed on a mobile device.

14. The method of claim 1, wherein
data about the object being measured is automatically collected or is input by the user and such data is stored in association with the measurement value.

15. The method of claim 14, wherein
the data about the object being measured is selected from the group consisting of time of image acquisition, location of image acquisition, demographic information about a person associated with the measurement, and species identification of an organism associated with the measurement.

* * * * *